US010742312B2

(12) United States Patent
Roy et al.

(10) Patent No.: US 10,742,312 B2
(45) Date of Patent: Aug. 11, 2020

(54) SATELLITE AND TERRESTRIAL LOAD BALANCING

(71) Applicant: Hughes Network Systems, LLC, Germantown, MD (US)

(72) Inventors: Satyajit Roy, Gaithersburg, MD (US); Channasandra Ravishankar, Clarksburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 16/279,999

(22) Filed: Feb. 19, 2019

(65) Prior Publication Data
US 2019/0260464 A1 Aug. 22, 2019

Related U.S. Application Data

(60) Provisional application No. 62/632,643, filed on Feb. 20, 2018.

(51) Int. Cl.
*H04B 7/185* (2006.01)
*H04L 12/761* (2013.01)
*H04W 88/06* (2009.01)

(52) U.S. Cl.
CPC ..... *H04B 7/18536* (2013.01); *H04B 7/18519* (2013.01); *H04B 7/18526* (2013.01); *H04B 7/18563* (2013.01); *H04B 7/18584* (2013.01); *H04B 7/18591* (2013.01); *H04L 45/16* (2013.01); *H04W 88/06* (2013.01)

(58) Field of Classification Search
CPC ............ H04B 7/18536; H04B 7/18519; H04B 7/18526; H04B 7/18563; H04B 7/18584; H04B 7/18591; H04L 45/16; H04W 88/06

USPC ........................................................ 455/427
See application file for complete search history.

(56) References Cited

U.S. PATENT DOCUMENTS

| 5,968,129 | A | 10/1999 | Dillon et al. |
| 9,088,963 | B2 | 7/2015 | Ravishankar et al. |
| 10,306,442 | B1* | 5/2019 | Nuttall .................... H04W 4/70 |
| 2011/0280178 | A1* | 11/2011 | Heifner ................. H04B 7/185 |
| | | | 370/325 |

(Continued)

FOREIGN PATENT DOCUMENTS

| EP | 1052812 A2 | 11/2000 |
| EP | 1635482 A2 | 3/2006 |

OTHER PUBLICATIONS

Invitation to Pay Additional Fees and Annex Communication Relating to the Results of the Partial International Search in PCT/US2019/018650 dated May 13, 2019.

*Primary Examiner* — Mong-Thuy T Tran
(74) *Attorney, Agent, or Firm* — Bejin Bieneman PLC

(57) ABSTRACT

A system includes a terminal. The terminal includes a terrestrial communication interface, a satellite communication interface and a computer. The terrestrial and satellite communication interfaces are configured to communicate traffic data. The computer is communicatively linked to the terrestrial and satellite communication interfaces. The computer executes instructions comprising, to determine that the traffic data, communicated via the terrestrial communication interface, exceeds a threshold, and based on the determination, to route at least a portion of traffic data via the satellite communication interface in accordance with a predetermined traffic data load-balancing scheme.

18 Claims, 13 Drawing Sheets

(56) References Cited

U.S. PATENT DOCUMENTS

| | | | |
|---|---|---|---|
| 2013/0121229 A1* | 5/2013 | Vare | H04H 20/22 |
| | | | 370/312 |
| 2015/0124616 A1 | 5/2015 | Lohman et al. | |
| 2015/0271730 A1* | 9/2015 | Benammar | H04W 36/30 |
| | | | 455/436 |
| 2016/0219024 A1* | 7/2016 | Verzun | H04L 9/34 |
| 2018/0338241 A1* | 11/2018 | Li | H04L 67/12 |
| 2019/0020406 A1* | 1/2019 | Lindqvist | H01Q 1/1257 |

\* cited by examiner

SATELLITE AND TERRESTRIAL LOAD BALANCING

CROSS-REFERENCE TO RELATED APPLICATIONS

This patent application claims priority to and all the benefits of U.S. Provisional Patent Application No. 62/632,643 filed on Feb. 20, 2018, which is herein incorporated by reference in its entirety

BACKGROUND

Terrestrial communication is utilized as a wireless communication technology, e.g., for communication of IoT (Internet of Things) devices to a remote server, etc. IoT devices such as sensors, actuators, smart devices, etc., may be deployed in various geographical areas. The IoT devices typically send data to a remote computer, e.g., an IoT server, and/or receive data from the remote computer. A congestion of a wireless network such as a terrestrial communication network and/or inadequate coverage of a location, e.g., unserved or underserved remote areas, may impact an operation of IoT devices.

DETAILED DESCRIPTION

Introduction

Figure 1:
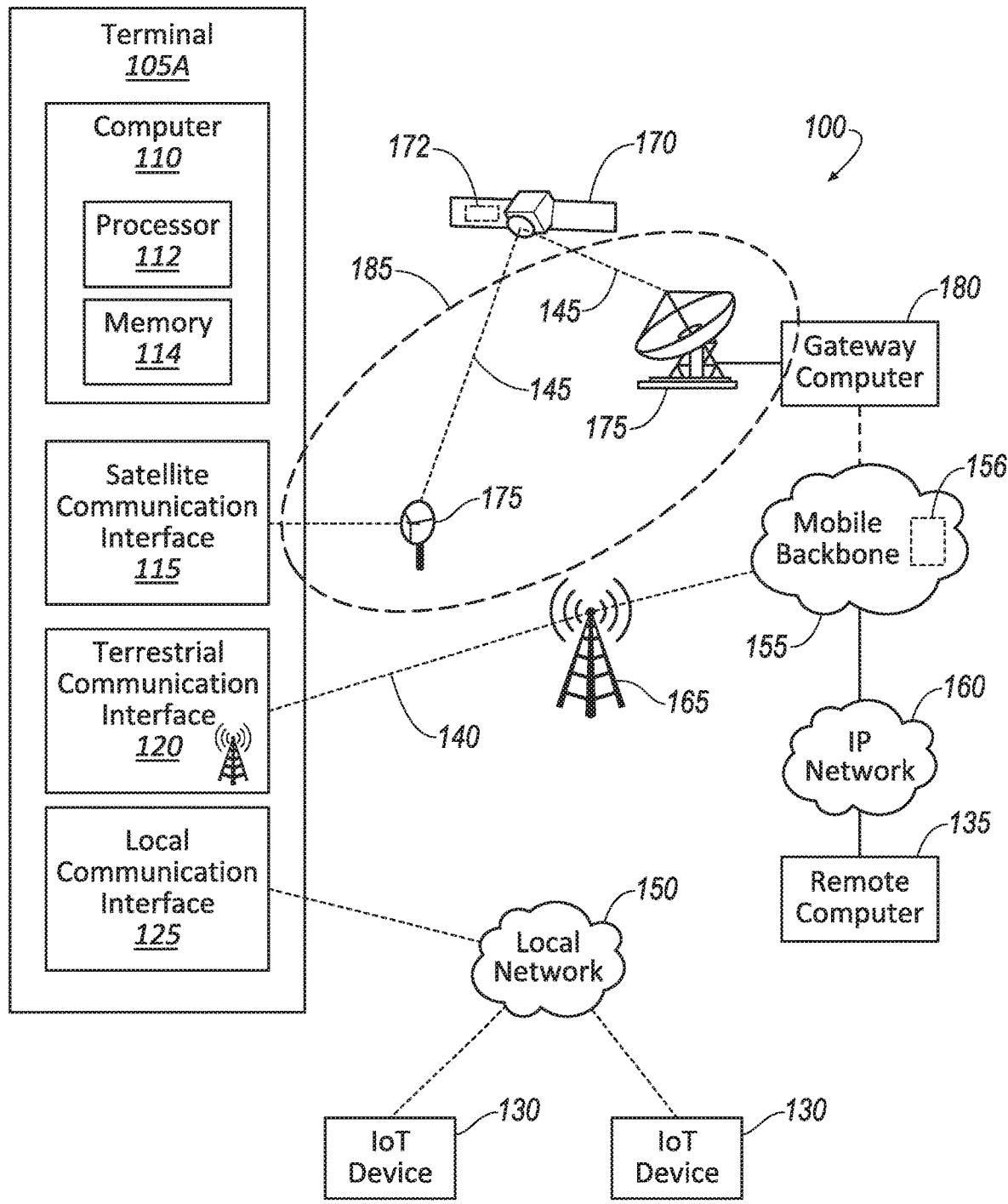
FIG. 1 illustrates an example communication network with a hybrid satellite terminal communicating via terrestrial and satellite communication networks.

Disclosed herein is a system comprising a terminal. The terminal includes a terrestrial communication interface, a satellite communication interface, and a computer. The terrestrial and satellite communication interfaces are configured to communicate traffic data. The computer is communicatively linked to the terrestrial and satellite communication interfaces, and the executes instructions comprising, to determine that the traffic data, communicated via the terrestrial communication interface, exceeds a threshold, and based on the determination, route at least a portion of traffic data via the satellite communication interface in accordance with a predetermined traffic data load-balancing scheme.

The computer may be further programmed to determine a terrestrial link quantifier and a satellite link quantifier, and select at least one of the terrestrial communication interface and the satellite communication interface further based on the terrestrial link quantifier and the satellite link quantifier.

The computer may be further programmed to determine a first score of the traffic data based on at least one of a data throughput, a data type quantifier, and a terrestrial link quantifier, and to route at least the portion of traffic data via the satellite communication interface upon determining that the first score of the traffic data exceeds the threshold.

The computer may be further programmed to determine the data type quantifier based at least on one of the data throughput, a data volume, and a data priority.

The computer may be further programmed to determine the data priority based at least in part on a latency threshold of the traffic data.

The computer may be further programmed to receive, via a local communication network, a plurality of data packets from a plurality of IoT devices, generate an aggregated data packet including the received plurality of data packets, and transmit the aggregated data packet via the satellite communication interface to the remote computer.

The computer may be further programmed to determine a first score of the plurality of data packets for communicating via the terrestrial communication interface, to determine a second score of the aggregated data packet for communicating via the satellite communication interface, and to transmit the aggregated data packet via the satellite communication interface upon determining that first score exceeds the second score.

The computer may be further programmed to communicate with one or more IoT devices, via an IoT interface, wherein the traffic data includes data received from or sent to the one or more IoT devices.

The system may further include a gateway computer, programmed to receive data from remote computer, and to multicast the received remote computer data to a plurality of terminals, wherein the plurality of terminals communicates with IoT devices via one or more local communication network.

The gateway computer may be further programmed to distribute an encryption key, in a unicast mode, to the plurality of second computers, to encrypt the received remote computer data with the key, and to multicast the encrypted remote computer data to the plurality of terminals.

The system may further include an IoT device comprising a second computer, programmed to receive the distributed key and the encrypted multicast data, to decrypt the multicast data based on the distributed key, and to actuate an actuator based on the decrypted data.

The gateway computer may be further programmed to receive, via a satellite uplink, a reception quality status including a link condition, and to adjust, based on the received quality status, at least one of multicast parameters including a data throughput, a transmission power, and a transmission spectral efficiency.

The gateway computer may be further programmed to divide, based on the received quality status, the plurality of terminals into a first group with a first set of multicast parameters and a second group with a second set of multicast parameters, to multicast the remote computer data based on the first set of multicast parameters via a first downlink, and to multicast the remote computer data based on the second set of multicast parameters via a second downlink.

Further disclosed herein is a system, comprising a gateway computer, programmed to receive data from a remote computer, to multicast the received data to a plurality of terminals, communicatively connected to IoT devices via one or more local communication networks, to receive, via a satellite uplink, a reception quality status from the plurality of terminals, wherein the reception quality status includes a link condition, and to adjust, based on the received quality status, at least one of multicast parameters including a data throughput, a transmission power, and a transmission spectral efficiency.

The gateway computer may be further programmed to divide, based on the received quality status, the plurality of terminals into a first group with a first set of multicast parameters and a second group with a second set of multicast parameters, to multicast the remote computer data based on the first set of multicast parameters via a first downlink, and to multicast the remote computer data based on the second set of multicast parameters via a second downlink.

Further disclosed herein is a method, comprising determining that traffic data of a terminal, communicated via a terrestrial communication interface of the terminal, exceeds a threshold, and based on the determination, routing at least a portion of traffic data via a satellite communication interface of the terminal in accordance with a predetermined traffic data load-balancing scheme, wherein the terrestrial and satellite communication interfaces are configured to communicate traffic data.

The method may further include determining a terrestrial link quantifier and a satellite link quantifier, and selecting at least one of the terrestrial communication interface and the satellite communication interface further based on the terrestrial link quantifier and the satellite link quantifier.

The method may further include determining a score of the traffic data based on at least one of a data throughput, a data type quantifier, and a terrestrial link quantifier, and routing at least the portion of traffic data via the satellite communication interface upon determining that the score of the traffic data exceeds the threshold.

The method may further include determining the data type quantifier based at least on one of the data throughput, a data volume, and a data priority.

The method may further include determining the data priority based at least in part on a latency threshold of the traffic data.

Further disclosed is a computing device programmed to execute the any of the above method steps.

Yet further disclosed is a computer program product comprising a computer readable medium storing instructions executable by a computer processor, to execute the any of the above method steps.

Exemplary System Elements

Operation of distributed systems such as IoT devices communicating with remote computers rely on wired and/or wireless communication networks which provide data communication between various parts of the system, e.g., IoT devices and IoT servers. However, a wireless communication network, e.g., a terrestrial wireless communication network, may fail to provide an efficient, reliable, and/or cost-effective path for communicating traffic data in a distributed system. This disclosure pertains to systems and methods to identify such conditions and improve wireless data communication in a distributed system.

Non-limiting examples of such a system may include a satellite terminal system having a terrestrial communication interface, a satellite communication interface, and a computer. The terrestrial and satellite communication interfaces can be configured to communicate traffic data (e.g., data exchanged between the IoT devices and IoT servers). The satellite terminal system can further include a computer communicatively linked to the terrestrial and satellite communication interfaces. The computer may be programmed to determine that the traffic data, communicated via the terrestrial communication interface, exceeds a threshold, and based on the determination, route at least a portion of traffic data via the satellite communication interface in accordance with a predetermined traffic data load-balancing scheme. Non-limiting examples of such a system may include a satellite computer that is programmed to receive, via a satellite uplink, terminal data from a satellite terminal on the ground, and multicast, via a downlink, the received terminal data, to a plurality of IoT devices.

FIG. 1 illustrates a block diagram of an example distributed system 100 including satellite terminal(s) 105A, IoT devices 130, and remote computer(s) 135, communicating via a combination of terrestrial communication link(s) 140, satellite communication links 145, local communication network(s) 150, a mobile communication network such as 5G Core mobile backbone 155, and/or an IP (Internet Protocol) network 160. In the illustration, only one satellite terminal 105A is shown for purposes of illustration; however, it should be appreciated that any suitable quantity of satellite terminals 105A may be used instead. In another example embodiment, one or more IoT devices 130 may be included in the terminal 105A. In other words, the terminal 105A may additionally provide IoT device 130 operation.

Distributed network 100 is a network of computers located in a geographical area, e.g., a building, a neighborhood, a city, a country, etc., that exchange data via a combination of wired and/or wireless communication networks. The distributed network 100 may include a variety of different types of communication networks such as terrestrial, satellite, local communication networks, etc., as discussed below. Internet of Things (IoT) is an example of a distributed network 100 including devices 130 such as smart devices, sensors, actuators, vehicles, etc. and remote computers 135 (sometimes referred to as IoT servers) that are connected wired and/or wirelessly to exchange data. In the present context, a remote computer 135 may be programmed to communicate with a plurality, e.g., thousands, of IoT devices 130, e.g., to transmit actuation instructions to an actuator IoT device 130, receive data from a sensor device 130, and/or update programming of an IoT device 130 such as a thermostat, etc. In the present context, a remote computer 135 may include multiple remote computers 135. In other words, not all programming of computer 135 discussed herein is necessarily implemented in one remote computer 135.

A communication network may be one or more of various wired or wireless communication mechanisms, including any desired combination of wired (e.g., cable and fiber) and/or wireless (e.g., cellular, wireless, satellite, microwave and radio frequency) communication mechanisms and any desired network topology (or topologies when multiple communication mechanisms are utilized). Exemplary communication networks include wireless communication networks (e.g., using one or more of cellular, Bluetooth, IEEE 802.11, etc.), local area networks (LAN) and/or wide area networks (WAN), including the Internet, providing data communication services.

A terrestrial communication system, e.g., LTE (Long-Term Evolution), 5G, etc. may include a mobile network backbone 155 and a plurality of base stations 165. The base stations 165 may be connected to the backbone 155 via a wired and/or wireless network. The base stations 165 provide a terrestrial communication link 140, e.g., 5G, LTE, etc., to the terminal 105A. The backbone 155 of the terrestrial communication system may be connected to an IP network 160, e.g., to provide access to the remote computer 135 via internet. A terrestrial communication link 140 is established when a wireless communication, e.g., via LTE protocol, is initiated between terminal 105A and a base station 165.

An IP (Internet Protocol) network 160 has a task of delivering data packets from a source host to a destination host solely based on an IP addresses in the packet headers. For this purpose, IP defines packet structures that encapsulate the data to be delivered. It also defines addressing methods that are used to label the datagram with source and destination information.

IoT devices 130 may be implemented by chips, circuits, electromechanical components, etc. IoT devices 130 typically include a communication interface, e.g., WiFi, Bluetooth, LAN (Local Area Network), etc., to communicate, e.g., via the terminal 105A, links 140, 145, etc., with a remote computer. An IoT device 130 may include a sensor such as temperature, pressure, etc. sensor and an IoT device 130 processor may be programmed to receive data from the sensor and send the received data via the IoT 130 interface to a remote computer. As another example, an IoT device 130 may include an actuator, e.g., an alarm, a relay, a hydraulic component, etc. and the IoT device 130 processor may be programmed to receive data from a remote computer and actuate the IoT device 130 actuator based on the received data. As another example, an IoT device 130 may be a thermostat, a programmable control unit, etc. The IoT devices 130 may be connected to the terminal(s) 105A via a local communication network 150. The local communication network 150 may be an IP-based network such as an IEEE 802.15.4, low power Wi-Fi, 6LoWPAN (IP version 6 over Low-Power Wireless Personal Area Networks), etc. Additionally, or alternatively, a local communication network 150 may be a non-IP based network such as NFC (Near-Field Communication), LoRa™ (Long Range), BLE (Bluetooth Low Energy), Zigbee, etc.

The system 100 may include satellite(s) 170 that provide wireless communication via the satellite links 145 to one or more terminals 105A which are within a coverage area 185 of the satellite 170. In the present context, a satellite link 145 is a wireless communication between a dish 175 antenna and a satellite 170 antenna. A satellite link 145 may include an uplink, including communication from terminal 105A to a satellite 170, a gateway 180, etc. and/or a downlink, which includes communication from the satellite 170 to the terminal 105A, gateway 180, etc.

Satellite 170 may include a computer 172 having a processor and a memory storing instructions to operate the satellite 170, e.g., including providing configuring links 145 (uplink and/or downlink), receiving and/or transmitting data, etc. In another example, the satellite 170 may include a bent-pipe implementation that forwards the received information without any data processing. In the present context, a coverage area 185 of a satellite 170 is a geographical area on the surface of Earth, in which terminal 105A, gateway 180, etc., may communicate with the satellite 170. In one example, a coverage area 185 may be an area, e.g., a city, etc., covered with a spot beam. In yet another example, a coverage area 185 may be an area covered by a gateway beam, i.e., available for communication with a gateway 180 on Earth. Other parameters such as weather conditions, objects such as buildings, trees, etc., may affect a coverage area, e.g., reduce the coverage area 185. A shape, dimensions, etc., of a coverage area 185 may depend on multiple parameters such as a distance of the satellite 170 from the Earth, a width of an electromagnetic beam of the satellite, etc. For example, a wide beam from satellite 170 may result in coverage area 185 being a large area, e.g., a country, whereas a narrow beam from satellite 170 may result in coverage area 185 being smaller—e.g., such as a metropolitan area.

In the present context, terminal 105A is a computer-based communication device that provides an interface between the IoT devices 130 (or the like) and the remote computers 135 via the satellite link(s) 145 and/or the terrestrial link(s) 140. In one non-limiting example, the terminal 105A may be a very small aperture terminal (VSAT). Terminal 105A is implemented via circuits, chips, antennas, or other electronic components that can communicate with satellites 170 and terrestrial base stations 165 which are within communication range of the terminal 105A. In some instances, the terminals 105A are stationary relative to a location on Earth. In other instances, the terminal 105A is mobile, meaning that the terminal 105A moved relative to a location on the Earth. For instance, the terminal 105A may be configured to receive communications from satellite 170 or terrestrial base station 165 and transmit such communications via the local communication network 150, e.g., Wi-Fi, Zigbee, etc., to the IoT devices 130. Additionally, or alternatively, the terminal 105A may receive communication, e.g., sensor data, from IoT device(s) 130 and transmit such communication to the remote computer 135.

With continued reference to FIG. 1, the terminal 105A may include a computer 110 including a processor 112 and a memory 114, a satellite communication interface 115, terrestrial communication interface 120, and a local communication interface 125. The processor may be implemented via circuits, chips, or other electronic component and may include one or more microcontrollers, one or more field programmable gate arrays (FPGAs), one or more application specific integrated circuits (ASICs), one or more digital signal processors (DSPs), one or more customer specific integrated circuits, etc. The processors in computers 110 (or other devices 130, gateways 180, etc.) may be programmed to execute instructions stored in the memory 114, as discussed herein. The memory 114 includes one or more forms of computer-readable media, and stores instructions executable by the processor 112 for performing various operations, including as disclosed herein.

The satellite communication interface 115 includes physical layer components such as transceiver, modulator, demodulator, etc. to facilitate communication with satellites 170. Terminal 105A may include or be communicatively connected to one or more dish(s) 175 and antenna(s), which allow terminal 105A to communicate with one or more satellites 170 at a time.

The antenna may include a low-noise block downconverter (LNB) mounted on a dish 175, which may collect radio waves from the dish 175 and convert the collected radio waves to a signal which is sent through wired connection, e.g., a cable, to the terminal 105A. The antenna may be a combination of low-noise amplifier, frequency mixer, local oscillator and intermediate frequency (IF) amplifier. The antenna serves as a radio frequency (RF) front end of a terminal 105A, receiving a microwave signal from a satellite 170 collected by the dish 175, amplifying the received signal, and converting the block of frequencies to a lower block of intermediate frequencies (IF). This conversion of RF to a lower block of IF, allows the signal to be carried, e.g., via a wired connection, to terminal 105A. An antenna typically includes a sender antenna configured to send radio waves to a satellite 170, and/or a receiver antenna configured to receive radio waves from satellite 170.

The terrestrial communication interface 120 facilitates communication of the terminal 105A with base station 165. The terrestrial communication interface 120 is implemented via circuits, chips, or other electronic component such as a modulator, a demodulator, antenna, etc., configured to communicate via a specified frequency and communication protocol such as LTE, 5G, etc.

The local communication interface 125 facilitates communication of the terminal 105A via the local communication network 150, e.g., Wi-Fi. The local communication interface 125 may be implemented via chips, modulators, demodulators, antenna, etc.

As discussed above, the terminal 105A includes satellite and terrestrial communication interfaces 115, 120 and can communicate traffic data T via the satellite and/or terrestrial communication interface 115, 120 (e.g., split the traffic data T between the satellite and/or terrestrial communication interfaces 115, 120). In this context, the computer 110 may coordinate the communication of the traffic data T via the satellite and/or terrestrial communication interfaces 115, 120. In the present context, a second computer 156, e.g., included in the mobile backbone 155, may be programmed to coordinate the communication of the traffic data T with the block 270 of terminal 105A. Thus, when traffic data T sent from the terminal 105A is split between the terrestrial and satellite communication interface 115, 120, the computer 110 of the terminal 105A sends information to the second computer in the backbone 155 describing how the split information can be merged together, e.g., providing a list of instructions for how the data can be merged together. Thus, the second computer in the backbone can, upon receiving the portions of the traffic data T via the satellite and terrestrial communication links 140, 145, merge the received data together based on instructions received from the computer 110.

Figure 2:
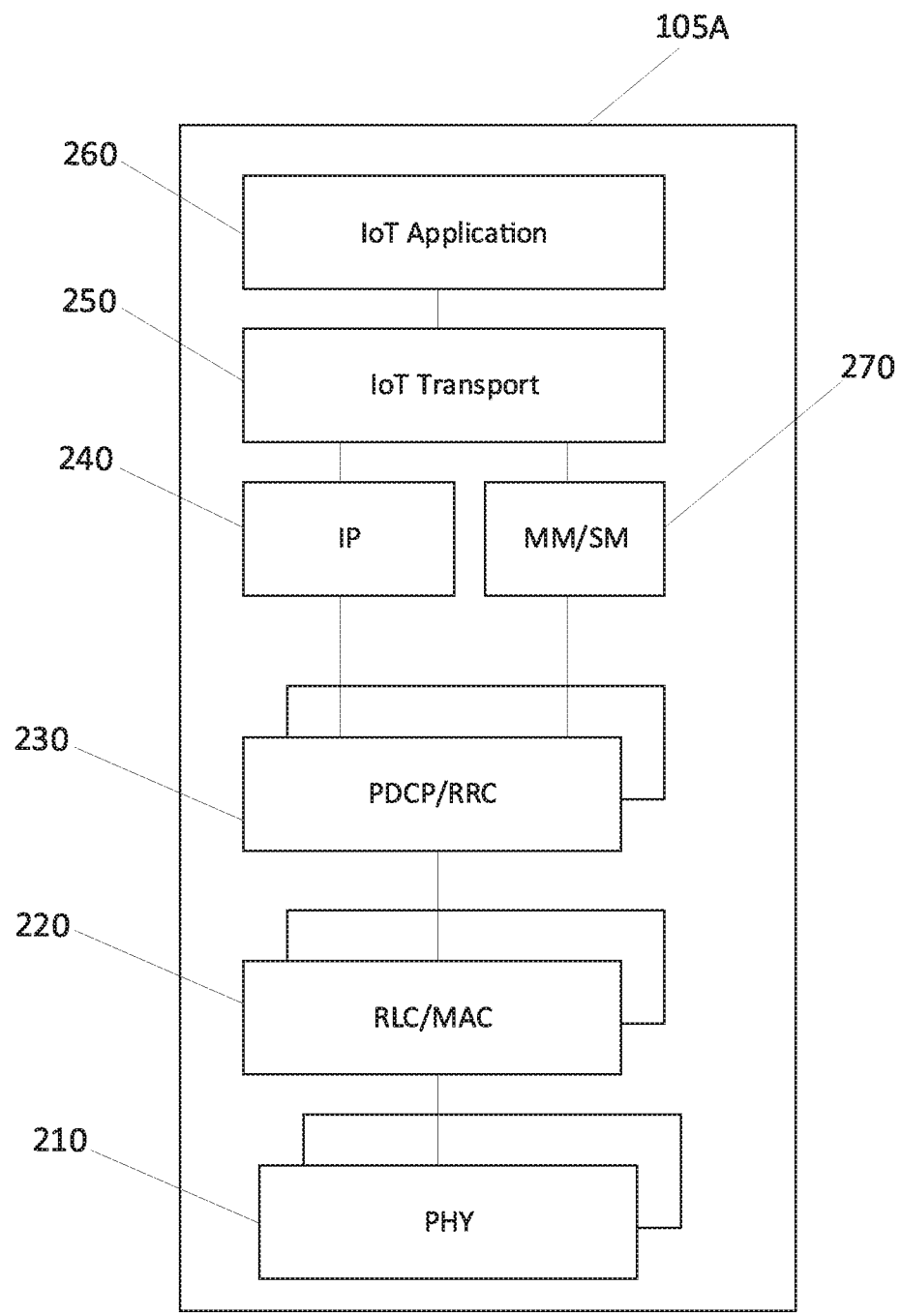
FIG. 2 is an example software architecture of the hybrid satellite terminal of FIG. 1.

FIG. 2 shows an exemplary software architecture of terminal 105A. The exemplary blocks PHY 210 (or physical layer), RLC/MAC 220 (or Radio Link Control/Medium Access Control), and PDCP/RRC 230 (or Packet Data Convergence Protocol/Radio Resource Control), which are shown as redundant blocks, represent OSI (Open System Interconnection) layers for each of the satellite and terrestrial communication. PHY 210 represent the software programming to operate the satellite and terrestrial communication interfaces 115, 120. Blocks IP 240, IoT Transport 250, and IoT Application 260 represent programming of the terminals 105A with respect to communication with IoT devices 130 via the local communication interface 125.

The computer 110 implements example blocks of FIG. 2 by executing programming stored on the memory of the computer 110 and actuating components of the terminal 105A, such as the communication interfaces 115, 120, 125. Thus, computer 110 can be programmed to communicate traffic data T between the IoT devices 130 and the remote computer(s) 135. In the present context, "traffic data T" includes any data including sensor data, actuation command, software update, etc., exchanged between devices 130 and the remote computer(s) 135, e.g., sensor data sent from IoT devices 130 to the remote computer 135, actuation command or software update sent from the remote computer 135 to IoT devices 130. In the present context, t (T) returns a throughput of the traffic data T, e.g., 50 Megabit/second (Mb/s). In the present context, the operator t( ) returns a throughput of data being communicated through terminal 105A, via satellite link 145, and/or via terrestrial link 140.

Figure 3:
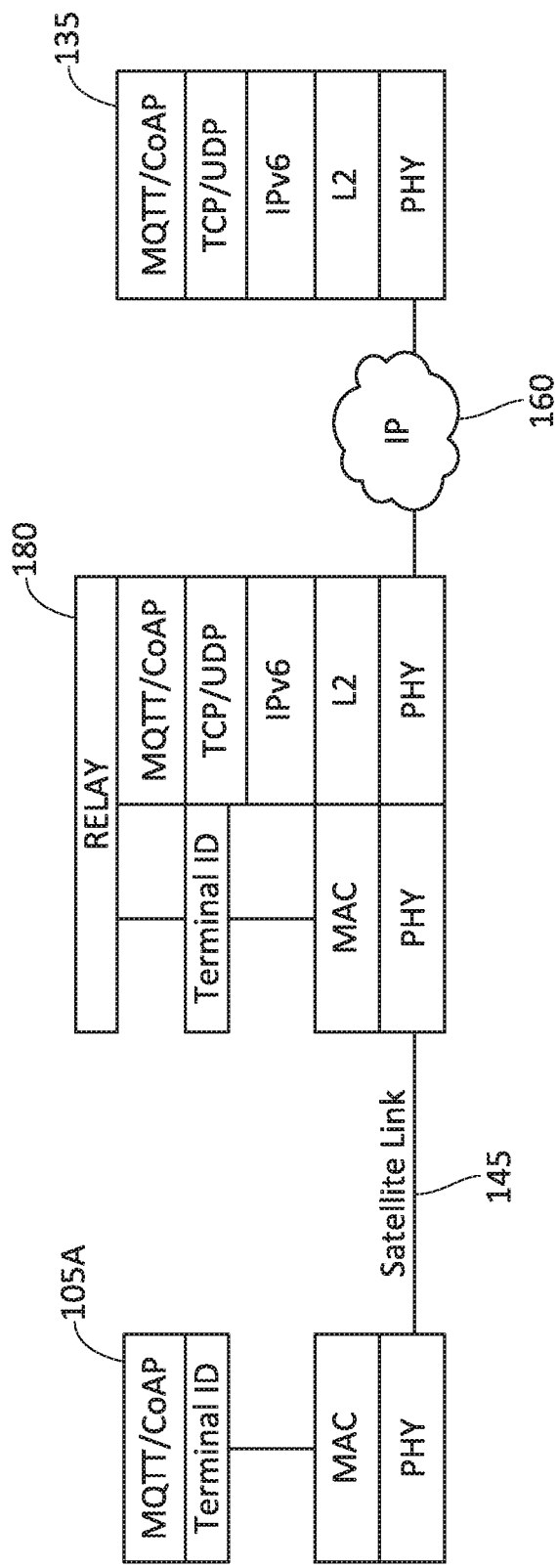
FIG. 3 is an example software architecture illustrating an operation of the gateway of FIG. 1.

Session Management and Mobility Management (SM/MM block 270) serves the underlying layers of the stack, i.e., taking advantage of the fact that protocols themselves are oblivious to whether the terminal 105A is communicating over a satellite link 145 or terrestrial link 140. In other words, the enhancements related to satellite link 145 and terrestrial link 140 are in the lower layers such as the physical layer PHY 210 and RLC/MAC 220, and/or PDCP/RRC 230. Traffic data T may be transmitted via the satellite link 145 based on a non-IP protocol. FIG. 3 illustrates an example diagram for facilitating communication between a non-IP-based satellite link 145 and an IP-based network 160. In an example non-IP based communication, the terminal 105A computer 110 may be programmed to send traffic data T with an identifier (e.g., 23-bit data with an extension bit) of the terminal 105A and an IoT service provider identifier (e.g., 7 bits data with an extension bit). Thus, the data may lack any TCP (Transmission Control Protocol)/IP header. In the present context, a service provider identifier is used to identify the remote computer, e.g., an IP address of the IoT server (i.e., the remote computer 135).

Gateway computer 180 (also shown in FIG. 1) may include a computer programmed to receive the traffic data T including the terminal 105A identifier and the service provider identifier, to convert the received traffic data T to IP-based data, and to communicate the generated IP-based data via IP network 160 and/or mobile backbone 155 to the remote computer 135. The gateway 180 computer may communicate with the satellite 170 via dish 175 and satellite link 145, as shown in FIG. 1.

In one example, the gateway 180 computer may store, e.g., in a computer memory, a table that includes a mapping of each of the service provider identifiers and corresponding IP addresses. The gateway 180 computer may be programmed to send a TCP/IP or UDP/IP data packet to remote computer 135 by determining the IP address of the remote computer 135 based on the stored table and the receive service provider identifier. The generated IP-based message may further include the terminal 105A identifier. The remote computer 135 may be programmed to transmit data for the terminal 105A including the received terminal 105A identifier and an IP address of the gateway 180. Similarly, the gateway 180 computer may be programmed to generate data for sending via the satellite link 145 to the respective terminal 105A based on the received terminal 105A identifier.

Computer 110 of terminal 105A can be programmed to determine that the traffic data T, communicated via the terrestrial communication interface 140, exceeds a threshold, and based on the determination, route at least a portion of traffic data T via the satellite communication interface 145 in accordance with a predetermined traffic data load-balancing scheme. In the present context, as discussed below, a threshold is (i) a number with a unit, e.g., a data throughput threshold $D_T$ of 50 Megabit/second (Mb/s), or (ii) a number without a unit, e.g., a score threshold $S_T$, a ratio, etc.

In one example, a load-balancing scheme includes a set of rules with an objective of balancing traffic load (e.g., data transmission rate) between the terrestrial and satellite communication links 140, 145. In the present context, a traffic load includes (i) data transmitted by the terminal 105A to the remote computer(s) 135, e.g., data received from one or more IoT devices 130 via the local communication network 150, and/or (ii) received from the remote computer(s) 135, e.g., to be transmitted to the IoT devices 130 via the location communication network 150. Herein, various non-limiting examples of load-balancing schemes are disclosed, according to which a terminal 105A computer 110 can be programmed to operate. Table 1 shows an example set of rules that can be used to balance the traffic load in the system 100. For example, the terminal 105A computer 110 may be programmed to operate based on one or more of the rules of Table 1.

TABLE 1

| No. | Condition | Description |
|---|---|---|
| 1 | Terrestrial data throughput (or data rate) exceeding a fixed data throughput threshold $D_T$. | A portion $T_S$ of traffic data T is communicated via a satellite link when data throughput of the terrestrial link $t(T_T)$ exceeds a fixed (e.g., stored in memory) threshold $D_T$, e.g., 50 (Mb/s). The portion for communicating via the satellite link is determined such that a rest of the throughput of the terrestrial link is less than the specified threshold $D_T$. |
| 2 | A score of data traffic exceeds a score threshold $S_T$. | A score of data traffic determined based on a data rate, a data volume, and a data priority exceeds a score threshold $S_T$, e.g., 1. A portion of data for communication via the satellite link may be determined based on the determined score, e.g., Table 2. |
| 3 | A first score of terrestrial link exceeds a second score of satellite link. | The traffic data T is split between the satellite and terrestrial links such that a specified balance between the first and second score is maintained, e.g., first score less than second score, first score at least 30% less than second score, first score less than half of second score, etc. |

Figure 4:
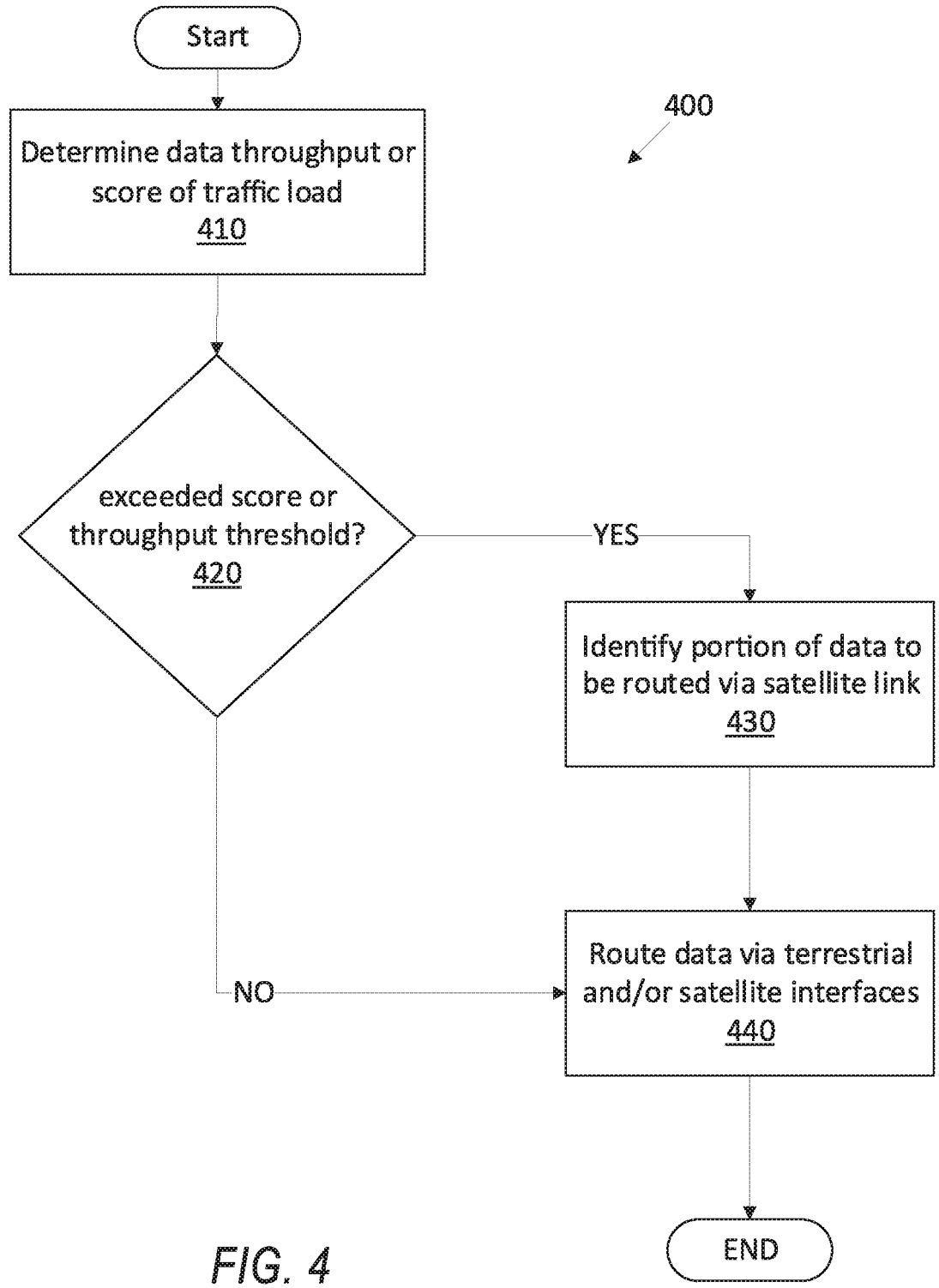
FIG. 4 is a flowchart of a first example process for balancing traffic data between terrestrial and satellite communication networks.

FIG. 4 shows a flowchart of a non-limiting example process 400 for balancing traffic data T between terrestrial and satellite communication networks based on rules 1 and/or 2 of Table 1. The computer 110 may be programmed to execute blocks of the exemplary process 400.

The process 400 begins in a block 410, in which the computer 110 determines a data throughput t (T) or a score S of traffic data for the terminal 105A. In one example, the computer 110 may be programmed to determine a data throughput t(T), e.g., in Mb/s, Gb/s, etc., of the terminal 105A, e.g., based on data analysis techniques, etc. The data throughput t(T) may include a unidirectional, e.g., sent out to the remote computer 135 by the terminal 105A. In another example, the computer 110 may be programmed, based on an equation (1), to determine a score S of the terminal 105A traffic load based on a data throughput t(T), and a data type quantifier $Q_D$. The function $f_1$ returns a score for the terminal 105A traffic load. The score S may be a number within a specified range, e.g., 1 to 10. In one example, the function $f_1$ may be a linear function, e.g., S=aT+b $Q_D$, wherein parameters a and b are based on empirical methods. The computer 110 may be programmed to determine the data type quantifier $Q_D$ based on equation (2).

$$S = f_1(T, Q_D) \quad (1)$$

$$Q_D = f_2(V, P) \quad (2)$$

In the present context, a data quantifier $Q_D$ is a measure to quantify data parameters which are relevant for a determination whether to communicate the data via terrestrial link 140 or satellite link 145. In one example, the computer 110 may be programmed, based on equation (2), to determine the data quantifier $Q_D$ based on data volume V and data priority P. The computer 110 may be programmed to determine the data volume V based on data received from a sender of the data, and/or other data analysis techniques. For example, the terminal 105A may determine a volume V of a bulk upload based on a data header transmitted at a beginning of a software update. The data volume V is volume, e.g., specified in Mb, Gb, etc., of data being transferred via the terminal 105A. For example, a volume V of a bulk upload is a volume of software downloaded from the remote computer 135 to a plurality of IoT devices 130.

In the present context, data priority P is a measure for specifying a criticality of transferring the traffic data T without interruption and/or delay. Table 2 shows example levels of, data priority P. The computer 110 may be programmed to determine data priority P based at least in part on a latency threshold $L_T$ of the traffic data T. For example, the computer 110 may be programmed to determine a high priority level upon determining that a maximum latency threshold $L_T$ of the traffic data T is less than or equal 100 millisecond (ms). The computer 110 may be programmed to detect a type of traffic data T, e.g., using deep packet inspection, packet header classification, or other traffic classification techniques, and to determine the latency threshold $L_T$ based on the detected type of data.

TABLE 2

| Type | Description | Priority P | Latency $L_T$ (ms) |
|---|---|---|---|
| High priority | Time sensitive data. | −1 | <10 ms |
| Normal | Less time sensitive but error sensitive data. | 0 (zero) | <150 ms |
| Low priority | Not time sensitive data. | 1 | >1 150 ms |

Next, in a decision block 420, the computer 110 determines whether a data throughput threshold $D_T$ and/or a score threshold $S_T$ is exceeded. In one example, the computer 110 may be programmed to determine whether the data throughput t(T) exceeds the data throughput threshold $D_T$, e.g., 50 Mb/s. In another example, the computer 110 may be programmed to determine whether the terminal 105A score S exceeds a score threshold $S_T$, e.g., 5. The computer 110 may be programmed to store the score threshold $S_T$ in a computer 110 memory and/or to receive the score threshold $S_T$ from a second computer such as the remote computer 135. If the computer 110 determines that the data throughput t(T) exceeds the data throughput threshold $D_T$ and/or the score S exceeds the score threshold $S_T$, then the process 400 proceeds to a block 430; otherwise the process 400 proceeds to a block 440.

In the block 430, the computer 110 identifies at least a portion $T_S$, of the traffic data to be routed via the satellite link 145 between the terminal 105A and a satellite 170. The computer 110 routes a portion of the traffic data via the satellite link 145 to balance the traffic data T between the satellite link 145 and the terrestrial link 140. In one example, the computer 110 may be programmed to determine the data portion $T_S$ to be routed via the satellite link 145 based on the data throughput t(T), the threshold $D_T$, and a capacity C of the satellite link 145. In the present context, a data portion $T_S$ includes a set of data, e.g., list of data packet identifiers, etc., that identifies specific parts of data from the traffic data. In the present context, $t(T_S)$ returns a throughput of the data portion $T_S$. The computer 110 may determine the throughput of the data portion $t(T_S)$ based on the identified data packets included in the data throughput portion $T_S$. For example, upon determining that the data portion $T_S$ includes a data packet from IoT sensor 130 with a rate to be sent every second with a volume V of 1 megabit, the computer 110 determines that data portion throughput t(T$_S$) is 1 Mb/second (Mb/S). For example, the computer 110 may be programmed, based on equation (3) to determine the data portion T$_S$. In the present context, a capacity C of a satellite link 145 is a maximum data throughput, e.g., 10 Gb/s, that the respective satellite link 145 provides.

$$t(D_S) = \begin{cases} t(T) - D_T & \text{if } T - D_T < C \\ C & \text{if } T - D_T \geq C \end{cases} \quad (3)$$

In another example, the computer 110 may be programmed to determine the data portion T$_S$ for satellite link 145 based on the score threshold S$_T$. For example, the computer 110 may be programmed to determine the data portion D$_S$ such that S$_M$=f$_1$(T−T$_S$, Q$_D$)<S$_T$. In other words, the computer 110 may determine a portion of the traffic data such that a score of the data T$_T$ (i.e., the data T−D$_S$) routed via the terrestrial link 140 is less than the score threshold S$_T$. For example, as shown in Table 3, the computer 110 may be programmed to identify low priority portions of the traffic load, e.g., bulk upload data, for being routed via the satellite link 145, such that the score S$_M$ of the data routed via the terrestrial link 140, e.g., a mobile network, is below the score threshold S$_T$. Thus, with reference to Table 3, T−T$_S$ (or T$_T$) represents a subtraction of a set of data T$_S$ from another set of data, in contrast to an algebraic subtraction.

TABLE 3

| Data components | T | T$_S$ | T$_T$ |
|---|---|---|---|
| High priority data transmitted from IoT device uploaded to remote computer | √ | | √ |
| High priority data for a second IoT device transmitted from remote computer | √ | | √ |
| Low priority bulk upload transmitted from IoT device to a remote computer | √ | √ | |

In the block 440, the computer 110 may be programmed to route the data portion T$_S$ via the satellite link 145 and the rest of data T$_T$ via the terrestrial link 140. The computer 110 may actuate the satellite communication interface 115 and/or the terrestrial communication interface 120, as discussed with reference to FIGS. 1-2, to route the data via the satellite and/or terrestrial links 140, 145. Routing of data by the terminal 105A computer 110 is further discussed with respect to FIGS. 9A-9B.

Following the block 440, the process 400 ends, or alternatively returns to the block 410, although not shown in FIG. 4.

Figure 5:
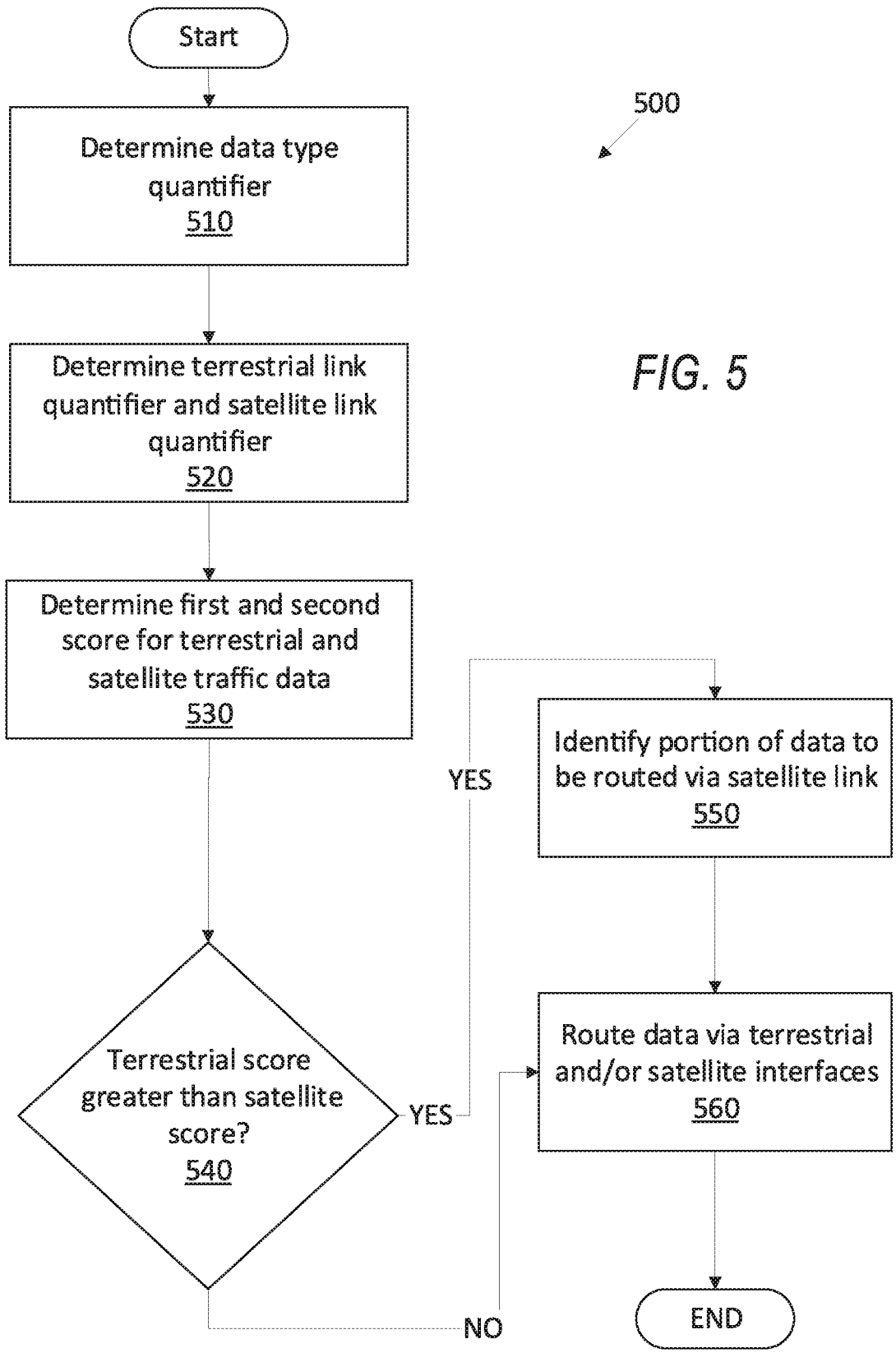
FIG. 5 is a flowchart of a second example process for balancing traffic data between terrestrial and satellite communication networks.

FIG. 5 shows a flowchart of another non-limiting example process 500 for balancing the data traffic on example rule 3 of Table 1. The computer 110 may be programmed to execute blocks of the exemplary process 500.

The process 500 begins in a block 510, in which the computer 110 determines a data type quantifier Q$_D$, as discussed above.

Next, in a block 520, the computer 110 determines a terrestrial link quantifier Q$_M$ and a satellite link quantifier Q$_S$ for the terrestrial link(s) 140 and the satellite link 145 respectively. The link's quantifiers Q$_M$, Q$_S$ may be numbers within a specified range, e.g., 1 to 6. With reference to Table 4, the computer 110 may be programmed to determine the link quantifiers Q$_M$, Q$_S$ based on a data rate capacity of the links 140, 145, link condition, e.g., weather conditions, etc.

In the present context, a link condition may be specified in percentage, e.g., 100% is a perfect condition such as no rain, no wind, no physical obstacle, etc., whereas 50% reflects a compromised link 140, 145 condition such as inclement weather, etc. Table 4 shows a non-limiting example of quantifiers Q$_M$, Q$_S$, capacity of link 140, 145, and a link condition. In one example, the computer 110 may be programmed to determine the quantifiers Q$_M$, Q$_S$ based on data stored in computer 110 memory such as Table 4.

TABLE 4

| Quantifier Q$_M$, Q$_S$ | Capacity of link | Link Condition |
|---|---|---|
| 1 | C > 1 Gb/s | 100% |
| 2 | 50 Mb/sec < C < 1 Gb/s | 100% |
| 3 | C < 50 Mb/sec | 100% |
| 4 | C > 1 Gb/s | 50% |
| 5 | 50 Mb/sec < C < 1 Gb/s | 50% |
| 6 | C < 50 Mb/sec | 50% |

Next, in a block 530, the computer 110 determines a terrestrial communication score S$_M$ and a satellite traffic data score S$_S$. The computer 110 may be programmed to determine the terrestrial traffic data score S$_M$ based on data portion T$_T$ routed through the terrestrial link 140 (e.g., T=T$_T$, if the traffic data is routed entirely through the terrestrial link(s) 140 of the terminal 105A), the volume V of data, and the terrestrial link quantifier Q$_M$, e.g., based on equation (3). The computer 110 may be programmed to determine the satellite traffic data score S$_S$ based on data throughput Ts, the volume V of data, and the satellite link quantifier Qs, e.g., based on equation (4). Equation (5) shows the relationship of traffic data T with portions T$_T$ and T$_S$ routed through each of the terrestrial and satellite links 140, 145.

$$S_M = f_2(T_T, V, Q_M) \quad (3)$$

$$S_S = f_3(T_S, V, Q_S) \quad (4)$$

$$T = T_T + T_S \quad (5)$$

Typically, routing a large number of smaller data packets (i.e., lower volume V) via terrestrial link 145 has less overhead, e.g., establishing connection, etc., compared to routing same large number of smaller packets via satellite link 145. Similarly, routing large volume V of data via satellite link 145 has less overhead compared to routing same data via terrestrial link 140, e.g., mobile communication. In one example, the functions f$_2$, f$_3$ may be specified such that transferring data T with small volumes V returns a lower score S$_M$ whereas returning a higher score S$_S$. For example, volume V may be a numerator in function f$_2$ whereas it is a denominator in the function f$_3$.

Next, in a decision block 540, the computer 110 determines whether the terrestrial score S$_M$ exceeds the satellite score S$_S$. If the computer 110 determines that the terrestrial score SM exceeds the satellite score S$_S$, then the process 500 proceeds to a block 550; otherwise the process 500 proceeds to a block 560.

In the block 550, the computer 110 identifies data portion T$_S$ and/or updates the data portion T$_S$ (as discussed with reference to the block 530). For example, the computer 110 may be programmed to identify the data portion T$_S$ such that the terrestrial score S$_M$ is less than or equal the satellite score S$_S$. For example, the computer 110 may be programmed to modify the set of data T$_S$ to increase a volume V of data T$_S$, e.g., by placing high volume V bulk upload in data portion T$_S$, as shown in Table 3).

In the block 560, the computer 110 routes the traffic load based on the identified data portion $T_S$ for the satellite link 145. The computer 110 may be programmed to route the data portion $T_S$ via the satellite link 145 and to route the rest of data $T_T$ via the terrestrial link 140. Further details of routing data are discussed below with reference to FIGS. 9A-9B.

Figure 6:
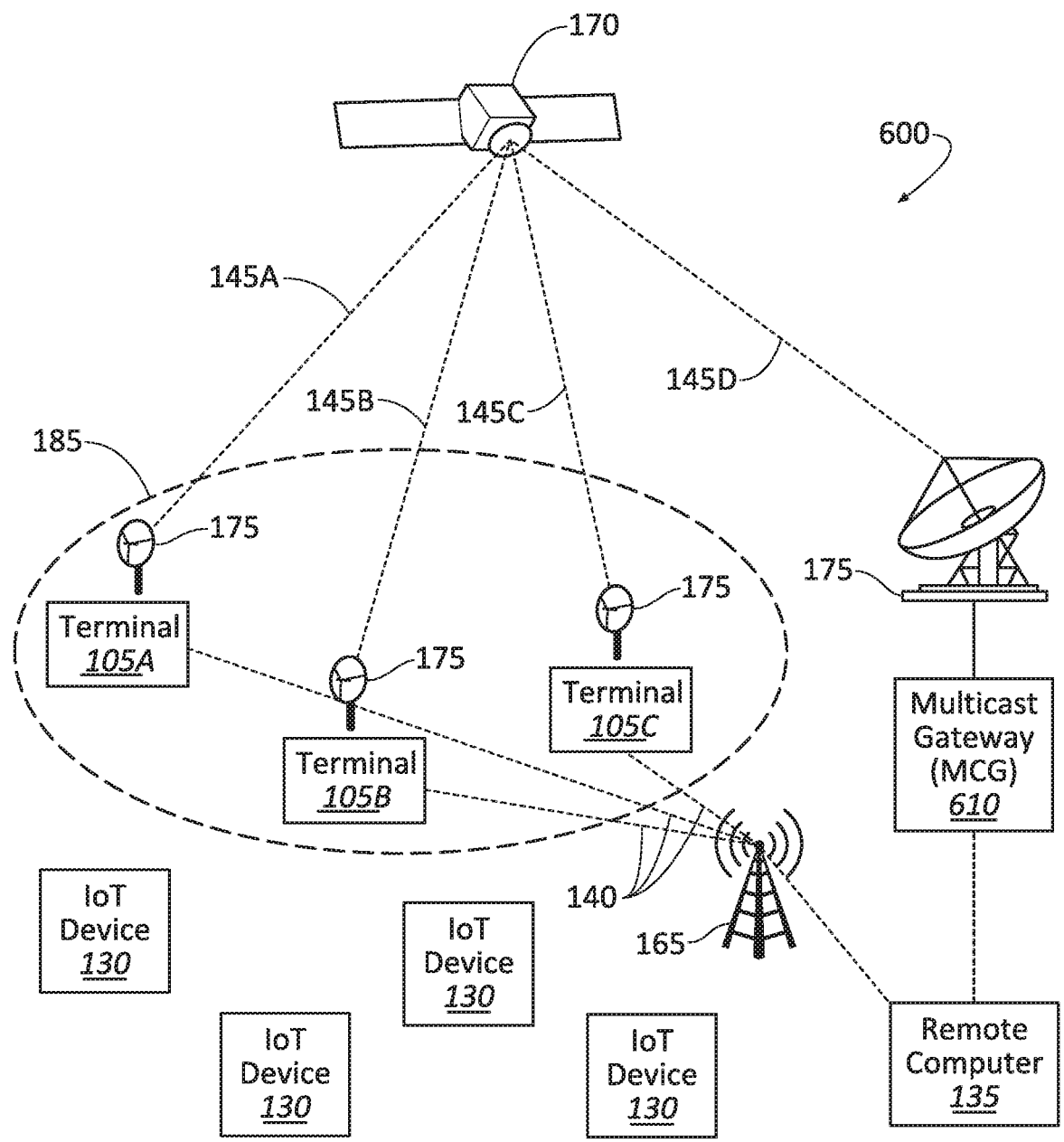
FIG. 6 is an example communication network for multicasting data to a plurality of IoT devices.

FIG. 6 shows a system 600 including a plurality of terminals 105A, 105B, 105C and a plurality of IoT devices 130 communicating via the plurality of terminals 105A, 105B, 105C with the remote computer(s) 135. In at least one example, terminals 105B and 105C (and their programming/operation) are similar or identical to terminal 105A; accordingly, these will not be re-described herein. While three terminals are shown in this figure, any suitable quantity of terminals may be used. The base station 165 and/or the multicast gateway (MCG 610) may communicate with the remote computer 135 via the mobile backbone 155, IP network 160, etc., although not shown in FIG. 6.

As discussed above, the traffic load may include data transmitted by the remote computer(s) 135 to the IoT devices 130, e.g., a software update. In one example, synchronous software upgrade of the plurality of IoT devices 130 in the system 600 can be achieved using satellite 170 communication forward channel multicast (or broadcast) operation. In a forward channel multicast operation (or multicast mode), one set of data is sent to terminals 105A, 105B, 105C (i.e., a one-to-many communication) within coverage area 185 of satellite 170, in contrast to a unicast communication (or communication in unicast mode) in which a one-to-one communication to each receiver is established. For example, a SDL (Software Downline Load) protocol can be used for a multicast software update. For example, the software update data packets can be uploaded via an uplink 145D to the satellite 170 and then transmitted concurrently in a multicast operation via downlinks 145A, 145B, 145C to the terminals 105A, 105B, 105C, e.g., via a beam that covers a geographical area in which the respective terminals are located. Typically, in a mobile backbone 155, IP network 160, data is transferred through unicast. As shown in FIG. 6, a Multicast Gateway (MCG 610) may operate as a router for the terminals 105A, 105B, 105C which participate in a multicast session. The satellite 170 gateway 180 may then receive multiple unicast streams from MCG 610 and select one of the received streams and transmit the selected stream via the satellite 170 beam, as further discussed with respect to FIG. 7. MCG 610 typically keeps track of the terminals 105A, 105B, 105C that have joined a multicast session and determines a modulation and a coding scheme, as well as power level to reach all the terminals 105A, 150B, 105C.

In one example, remote computer 135 of a utility company managing a smart grid may deliver a command to a group of actuators IoT devices 130 by multicasting via MCG 160 and terminals 105A, 105B, 105C. Thus, by multicasting instead of delivering individual commands to each IoT device 130 via separate mobile terrestrial communication links 140, signaling congestion and communication loads may be reduced. For multicasting purposes, devices 130 can be grouped based on which need the same downlink control messages (e.g., commands for actuators) and/or data packets (e.g., firmware/configuration or information file download). Additionally, or alternatively, the devices 130 can be grouped based on their service requirements (i.e. multicasting scenarios) or their physical location (i.e., geocasting scenarios), to reduce a signaling congestion on the air and/or to reduce the traffic load.

To protect satellite data communication against cyber-attacks, traffic data during a multicast may be encrypted. In an encrypted unicast communication, a sender of data may encrypt the data with an encryption key of a receiver and send the encrypted data to the receiver. In one example, an encryption technique such as PKI (Public Key Infrastructure), etc. may be used. The receiver may decrypt the received encrypted data based on the receiver's key, using known encryption techniques. However, an intruder computer may lack the encryption key of the receiver. Therefore, a cyber-attack may be prevented because the intruder computer, which eavesdrops decrypted data, cannot decrypt the encrypted data without possessing the encryption key.

Figure 7:
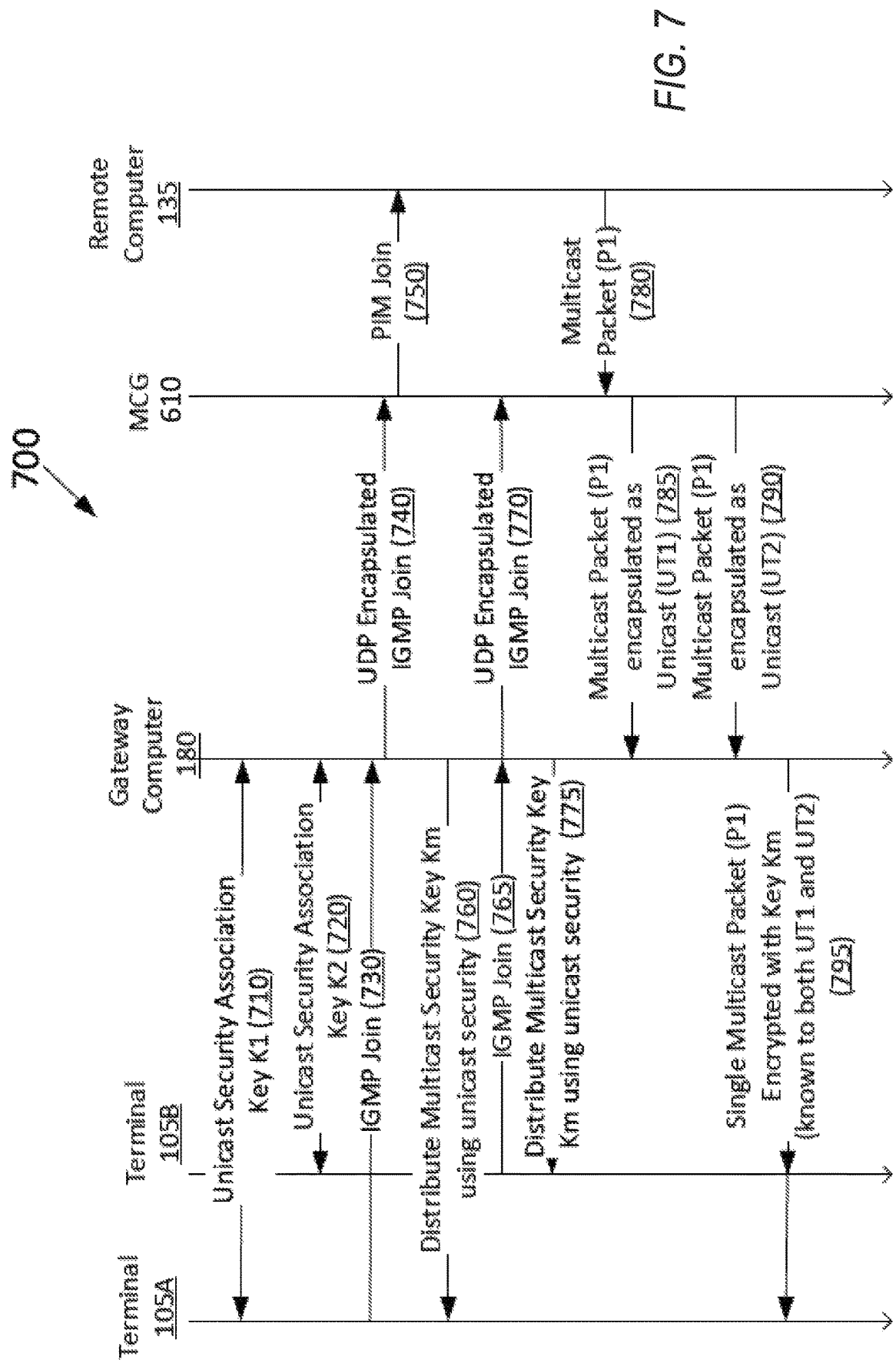
FIG. 7 is an example sequence diagram for multicasting encrypted data to a plurality of terminals.

Given an objective of achieving resource efficiencies by transmitting only one copy of data, e.g., via a spot beam, to reach multiple terminals 105A, 105B, 105C, which have joined a same multicast session, a unicast encryption technique may not be satisfactory, because each of the receivers of data (i.e., terminals 105A, 105B, 105C) may have a different encryption key. FIG. 7 is a sequence diagram 700 which illustrates a non-limiting example use case for multicasting encrypted data to a plurality of terminals 105A, 105B, 105C. The remote computer 135, MCG 610, satellite gateway 180, and terminals 105A, 105B may be programmed to execute actions of the sequence diagram 700. Although, the diagram 700 shows two terminals 105A, 105B, the disclosed method can be applied to any number of terminals 105A, 105B.

The sequence diagram 700 starts by terminals 105A, 105B performing a unicast security association with the gateway 180 (steps 710, 720). For example, the gateway 180 may communicate with each of the terminals 105A, 105B and receive the encryption key K1, K2 data of each of the terminals 105A, 105B. Thus, upon performing the unicast operations, the gateway 180 possesses encryption keys K1, K2.

Upon receiving an Internet Group Management Protocol (IGMP) join message (step 730, 765) from terminal 105A, the gateway computer 180 may transmit via the MCG 610 a PIM (Protocol Intendent Message) join message to the remote computer 135 (steps 740, 750, 770). The IGMP is a communications protocol used to establish multicast group memberships. PIM is a family of multicast routing protocols for IP networks 160 that provide one-to-many and many-to-many distribution of data over an IP-based network.

The gateway computer 180 may generate a common key Km for a multicast session. As will be explained below, the generated common key Km will be same for all terminals 105A, 105B (of the session), thus preventing a need for unicast transmission of encrypted data to each respective terminal. The gateway computer 180 may distribute the multicast security key Km via a unicast communication to each of the terminals 105A, 105B using individual keys K1, K2 (step 760). Thus, after receiving the distributed common key Km, each of the terminals 105A, 105B will be able to decrypt data encrypted with the common key Km.

The remote computer 135 may send multicast data packet P1 to the MCG 610 (step 780). MCG 610 may transmit the message via an IP-based network through multiple unicast messages to the gateway 180 (steps 785, 790), whereas as shown in the diagram 700, the gateway 180 will then select one of the streams, encrypt the data with the common key Km, and multicast the encrypted packet P1 to the terminals 105A, 105B (step 795).

Upon receiving the encrypted multicast data, each of the terminals 105A, 105B may be programmed to decrypt the received multicast data based on the stored common key Km. Thus, the satellite 170 may multicast the data packet P1 to the plurality of terminals 105A, 105B, and each of those terminals 105A, 105B may concurrently receive the data, multicasted by the satellite 170.

As discussed above, a condition of satellite link 145 may vary, e.g., based on weather condition, obstacles, etc. With reference to FIG. 6, when satellite 170 multicasts data to the plurality of terminals 105A, 105B, 105C, a reception of different terminals 105A, 105B, 105C may differ. For example, terminal 105A may support a high spectral efficiency (i.e., high data rate for a given bandwidth) compared to terminal 105B. The satellite 170 computer 172 and/or the gateway 180 may be programmed to determine multicast parameters, e.g., data rate, frequency of the beam, etc., in accordance with a poorest link condition, i.e., such that the terminal with a lowest reception among the terminals 105A, 105B, 105C is expected to support the received multicast data.

Although this approach may be helpful in providing a possibility of multicasting data to the plurality of terminals 105A, 105B, 105C with a wide range of link conditions, power level, etc., but it may not be efficient because it may not utilize the terminals with a higher link condition, etc. In other words, by configuring the multicast based on low performing terminals (i.e., with lower link conditions), the satellite 170 may not utilize the terminals which support, e.g., higher data rate, frequency, etc.

In one example, discussed here below with reference to FIG. 8, the terminals 105A, 105B, 105C may be divided into subgroups based on the respective link conditions, physical attributes, etc. In the present context, physical attributes of terminals 105A, 105B, 105C are specific parameters of the satellite communication interface 115, antenna, etc., such as modulation, coding, power, etc. In the present context, a subgroup includes the plurality of terminals 105A, 105B, 105C being located within the coverage area 185 of the satellite 170 and being selected based on the respective physical attributes and/or link conditions.

Figure 8:
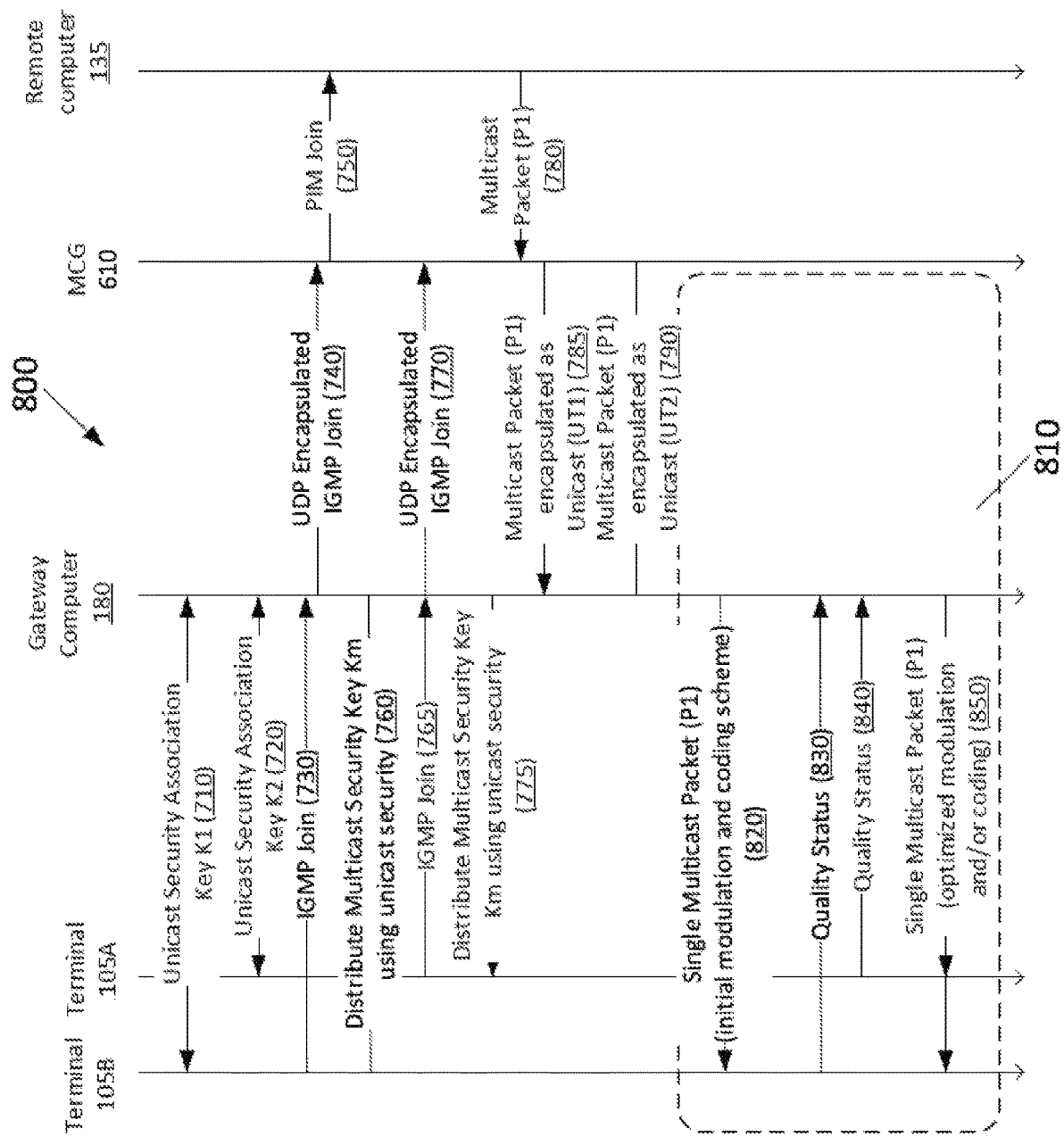
FIG. 8 is an example sequence diagram for adapting satellite downlink(s) for multicasting data to a plurality of terminal with different reception characteristics.

FIG. 8 shows a sequence diagram 800 including a link adaptation portion 810. With reference to the portion 810 of the diagram 800, the satellite 170 computer 172 may be programmed to receive, via a satellite uplink 145, a quality status $R_Q$ including a link condition, and to adjust, based on the received quality status $R_Q$, at least one of multicast parameters including a data throughput, a transmission power, and a transmission spectral efficiency. Spectral efficiency is an information rate that can be transmitted over a given bandwidth in a specific communication system, e.g., measured in bit/s/Hz.

With reference to FIGS. 7 and 8, the sequence diagram 800 illustrates a similar sequence such as shown in FIG. 7 up to broadcasting the common encryption key Km to the terminals 105A, 105B (step 775). However, after that step 775, based on the sequence diagram 800, the satellite 170 computer may adjust the multicast parameters based on quality status $R_Q$ received from the terminals 105A, 105B (steps 820, 830, 840, 850), as further discussed with reference to FIGS. 9A-9B.

Figure 9A:
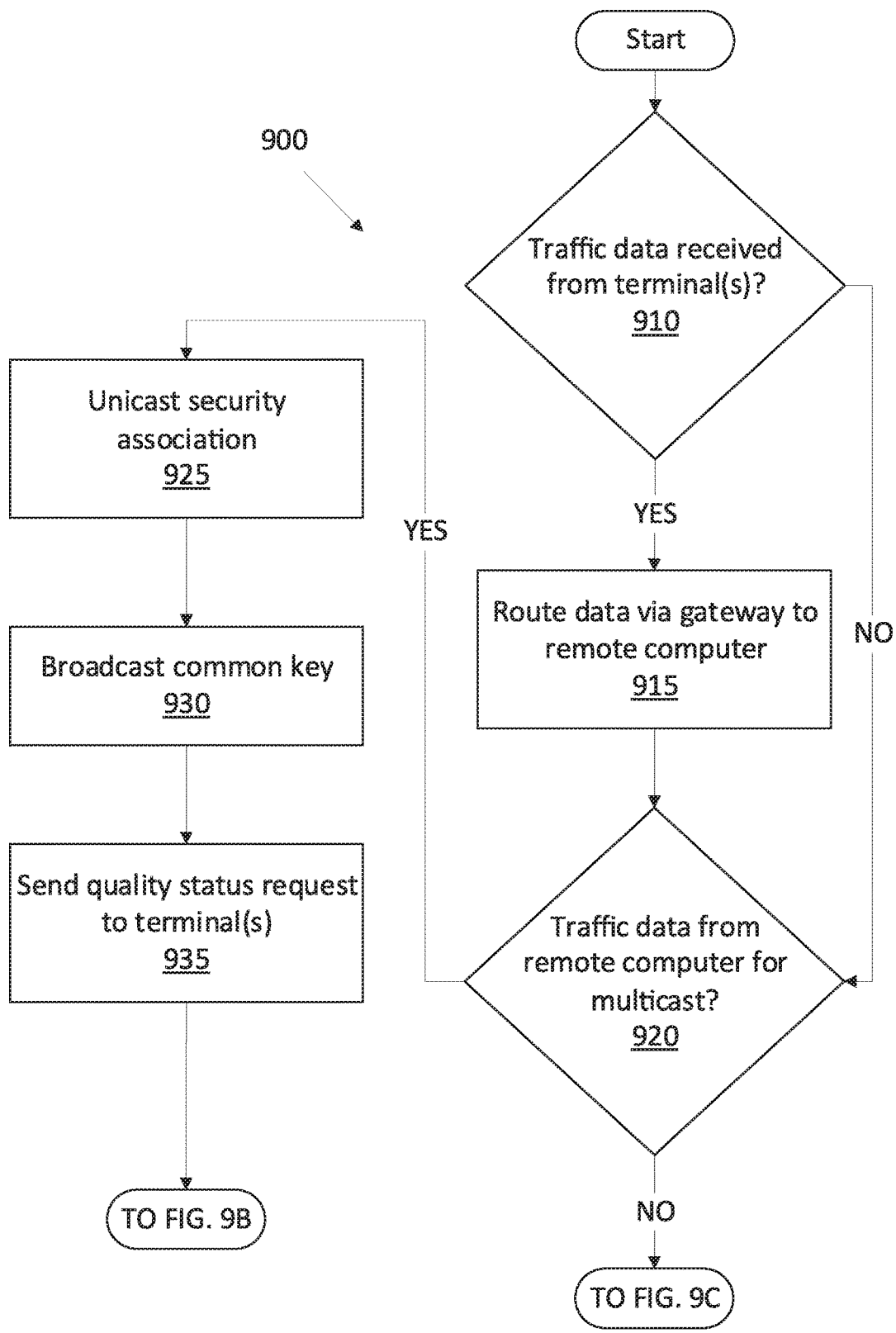
FIGS. 9A-9C are an example flowchart for operating a satellite or a satellite gateway.
Figure 9B:
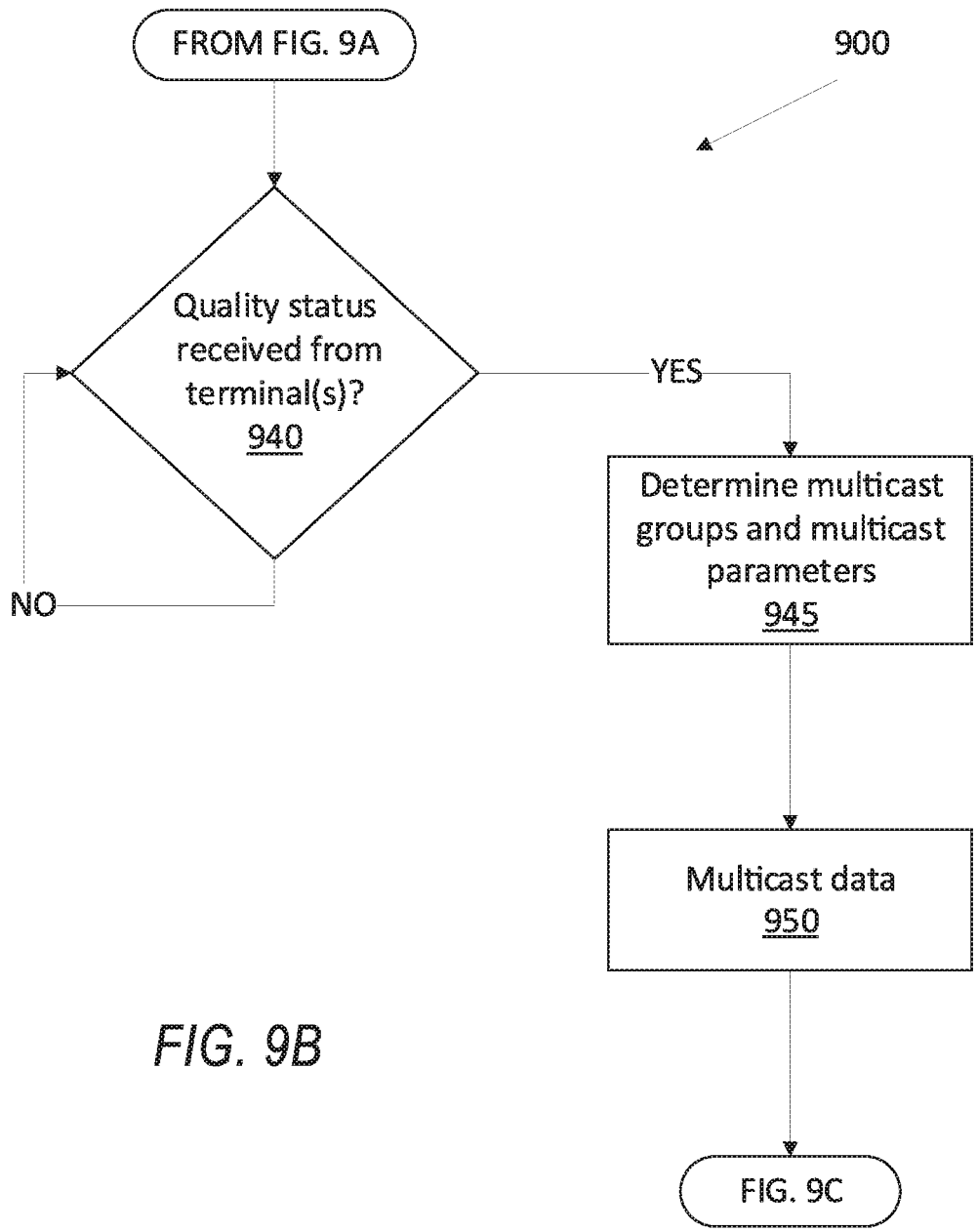
Figure 9C:
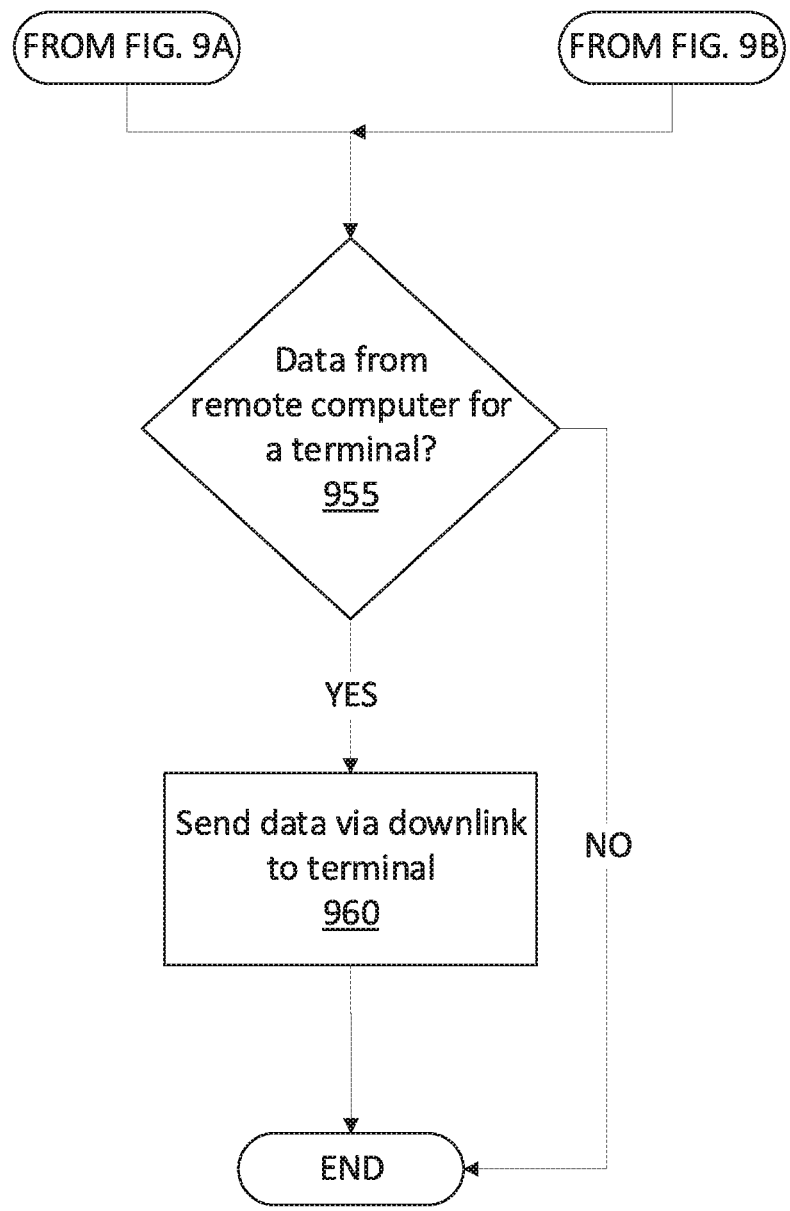

FIGS. 9A-9C are a flowchart of a process 900 for operating satellite 170. For example, a gateway computer 180 may be programmed to execute blocks of the process 900.

The process 900 begins in a block 910 in which the gateway computer 180 determines whether traffic data $T_S$ is received from terminal(s) 105A, 105B, 105C, e.g., sensor data which terminals 105A, 105B, 105C received from IoT devices 130. If the gateway computer 180 determines that traffic data is received from one or more terminals 105A, 105b, 105C, then the process 900 proceeds to a block 915; otherwise the process 900 proceeds to a decision block 920.

In the block 915, the gateway computer 180 routes the traffic data $T_S$ via satellite 170 downlink 145 to remote computer 135, e.g., an IoT server. The gateway computer 180 may route the traffic data $T_S$ via the gateway 180, the mobile backbone 155, and/or the IP network 160 to the remote computer 135, e.g., an IoT server.

As discussed with reference to FIG. 1, the traffic data T received from the terminals 105A, 105B, 105C may be split by the terminal 105A, 105B, 105C to data $T_T$ for terrestrial link 140 and data $T_S$ for the satellite link 145. A computer of the mobile backbone 155 may merge the traffic data $T_T$ received via the terrestrial link 140 and data $T_S$ received from the satellite 170 downlink 145 in accordance with the determination of the respective terminal 105A, 105B, 105C to split the data (as discussed above with reference to the block 270 of FIG. 2). Further, the computer of the mobile backbone 155 may split the traffic data going out from the remote computer 135 to the terminals 105A, 105B, 105C based on determination made at the terminal 105A, 105B, 105C, and/or determination made at the backbone 155 and/or gateway 180 on how to split the data transmitted to the terminals 105A, 105B, 105C between the links 140, 145. In one example, such determination may be made based on similar techniques discussed with respect to equations (1)-(5).

In the decision block 920, the gateway computer 180 determines whether data is received from the remote computer 135 for multicast to terminals 105A, 105B, 105C. In other words, gateway computer 180 may determine whether a multicast session is needed. Additionally, or alternatively, the gateway computer 180 may determine that a multicast session is needed based on IGMP join messages received from the terminals 105A, 105B, 105C (see FIGS. 7-8). The gateway computer 180 may be programmed to communicate based on a PIM protocol with the remote computer 135. If the gateway computer 180 determines that data for multicast is received and/or IGMP join messages are received, then the process 900 proceeds to a block 925; otherwise the process 900 proceeds to a decision block 955 (see FIG. 9C).

In the block 925, the gateway computer 180 performs a unicast security association. The gateway computer 180 may be programmed to receive terminals 105A, 105B, 105C encryption keys K1, K2, K3 and store in gateway computer 180 memory. Additionally, or alternatively, the gateway computer 180 may be programmed to send a request for the encryption keys K1, K2, K3 to the terminals 105A, 105B, 105C, and to store the received keys K1, K2, K3.

Next, in a block 930, the gateway computer 180 distributes the common key Km to the terminals 105A, 105B, 105C. The gateway computer 180 may be programmed to send the common key Km to each of the terminals 105A, 105B, 105C using the individual keys K1, K2, K3 of each terminal 105A, 105B, 105C.

Next, in a block 935, gateway computer 180 transmits a request for a quality status $R_Q$ to each of the terminals 105A, 105B, 105C. For example, gateway computer 180 may be programmed to multicast a specified data to the terminals 105A, 105B, 105C with a set of different specified data rates, power levels, and frequencies. The specified data and/or the set of data rates, etc. may be stored in a gateway computer 180 memory.

Next, as shown in FIG. 9B, the gateway computer 180 determines whether quality statuses $R_Q$ are received from the terminals 105A, 105B, 105C. In the present context, a quality status $R_Q$ of a terminal 105A, 105B, 105C includes information describing how successful satellite link 145 routes data between the satellite 170 and the respective terminal 105A, 105B, 105C. In one example, a quality status $R_Q$ describes the link condition. In one example, a quality status $R_Q$ includes a link condition specified in a percentage value. Additionally, or alternatively, the quality status $R_Q$ includes data such as a percentage of corrupted data received, etc. The gateway computer 180 may store the quality status $R_Q$ of each of the terminals 105A, 105B, 105C in the gateway computer 180 memory, e.g., in a table. If the quality statuses quality status $R_Q$ are received, the process 900 proceeds to a block 945; otherwise the process 900 returns to the decision block 940. Alternatively, the process 900 may end or proceed without the quality status quality status $R_Q$, although not shown in FIG. 9B.

In the block 945, the gateway computer 180 determines groups of terminals 105A, 105B, 105C for multicast and further determines multicast parameters, e.g., data rate, spectral efficiency of the beam, etc., based on the received quality status $R_Q$. For example, the gateway computer 180 may divide, based on the received quality status $R_Q$, the terminals 105A, 105B, 105C into a first group of terminals 105A, 105C with a first set of multicast parameters and a second group of terminal(s) 105B with a second set of multicast parameters. For example, as shown in Table 5, the gateway computer 180 may determine a first group having terminals 105A, 105C with quality status $R_Q$ values 95% and 80%, and a second group having the terminal 105B with quality status $R_Q$ value 50%, based on the quality statuses $R_Q$. In one example, the multicast of data with the first set and second set of multicast parameters may be via a same beam of the satellite 170. In another example, multicasting of the data with the first and second set of parameters may be via a first and a second beam of the satellite 170 that overlap.

As shown in Table 5, the gateway computer 180 may determine corresponding multicast parameters for each group, e.g., "High," and "Low". In an example, the gateway computer 180 may determine multicast parameters based on a table such as Table 6. Table 6 shows an example for defining multicast parameters as a "High", "Medium", or "Low" level. Each of the levels may be associated with a specific data rate, spectral efficiency, etc. For example, power may be maintained constant but by changing modulation and/or coding data rate may be adjusted. The spectral efficiency is an indicator of modulation and coding scheme. As shown in Table 6, the gateway computer 180 may determine the terminals 105A, 105C with a quality status $R_Q$ exceeding a quality threshold 75% as a first group with multicast parameter "High" level, whereas determines the terminal 105B with the quality status $R_Q$ of 50% (which is less than the threshold 60% of Table 6) as the second group with multicast parameter "low" level. Additionally, or alternatively, the computer may be programmed to group the terminals 105A, 105B, 105C based on other techniques, e.g., using statistical methods to identify groups with a deviation of quality status $R_Q$ less than a deviation threshold. Additionally, or alternatively, the gateway computer 180 may be programmed to determine the multicast parameters using other techniques, e.g., adjusting each of the data rate, power, etc., for a group based on an average quality statuses $R_Q$ received from the terminals 105A, 105B, 105C of the respective group.

TABLE 5

| Groups | Terminals | Quality Status | Multicast Parameters |
|---|---|---|---|
| 1 | 105A, 105C | 95%, 80% | High |
| 2 | 105B | 50% | Low |

TABLE 6

| Multicast parameter set | Data rate (Mbps) | Spectral Efficiency (bits/s/Hz) | Quality Status threshold |
|---|---|---|---|
| High | 81.2 Mbps | 1.624 | 75% |
| Medium | 60.8 Mbps | 1.216 | 60% |
| Low | 36.3 Mbps | 0.725 | 0% |

Next, in a block 950, the gateway computer 180 multicast the data to the terminals 105A, 105B, 105C based on the first set of multicast parameters via a first downlink 145, and multicast the data based on the second set of multicast parameters via a second downlink 145. For example, with respect to Table 5, the gateway computer 180 may be programmed to multicast data with "high" level multicast parameters to the terminals 105A, 105B, and with the "low" multicast parameters to the terminal 105B. In one example, the first and second downlinks 145 may be included in a same beam of the satellite 170. In another example, the first and second links 145 may be in different beam of the satellite 170. Following the block 950, the process 900 proceeds to a decision block 955 (see FIG. 9C).

With reference to FIG. 9C, following either of the blocks 920 of FIG. 9A or the block 950 of FIG. 9B, in the decision block 955, the gateway computer 180 determines whether data is received from the remote computer 135 for terminal 105A, 105B, 105C. If the gateway computer 180 determines that data for transmitting to a terminal is received from the remote computer 135, e.g., via the IP network 160, backbone network 155, etc., then the process 900 proceeds to a block 960; otherwise, the process 900 ends, or alternatively returns to the block 910, although not shown in FIG. 9C.

In the block 960, the gateway computer 180 sends the received data to the respective terminal(s) 105A, 105B, 105C. The gateway computer 180 may determine the receiver terminal 105A, 105B, 105C of the data based on, e.g., header data including a terminal identifier, as discussed above with reference to FIG. 3. Following the block 960, the process 900 ends, or alternatively returns to the block 910, although not shown in FIG. 9C. As another example, a satellite 170 computer 172 may be programmed to execute one or more blocks of the process 900.

Figure 10A:
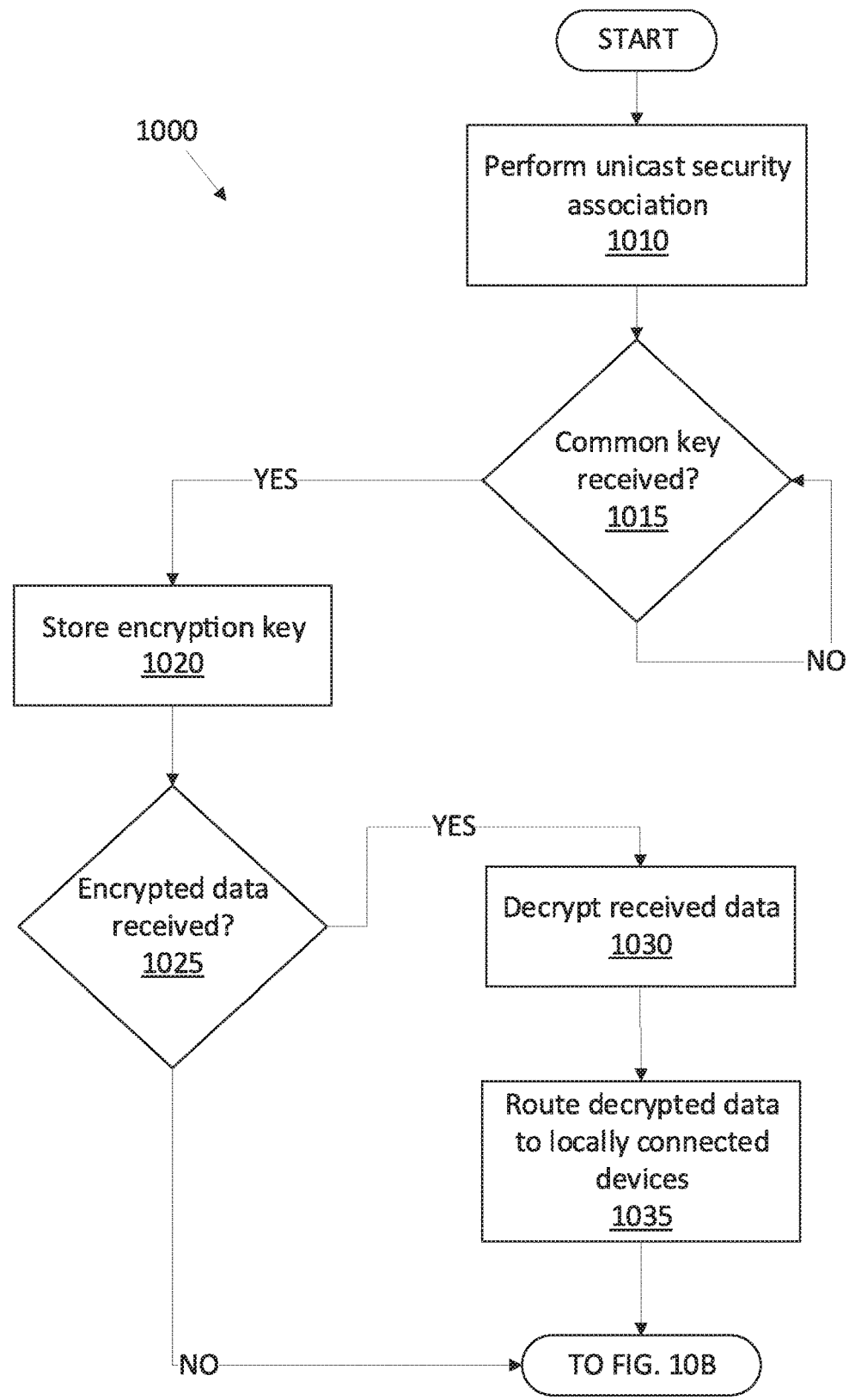
FIGS. 10A-10B are an example flowchart for routing data via terrestrial and satellite interfaces of a satellite terminal.
Figure 10B:
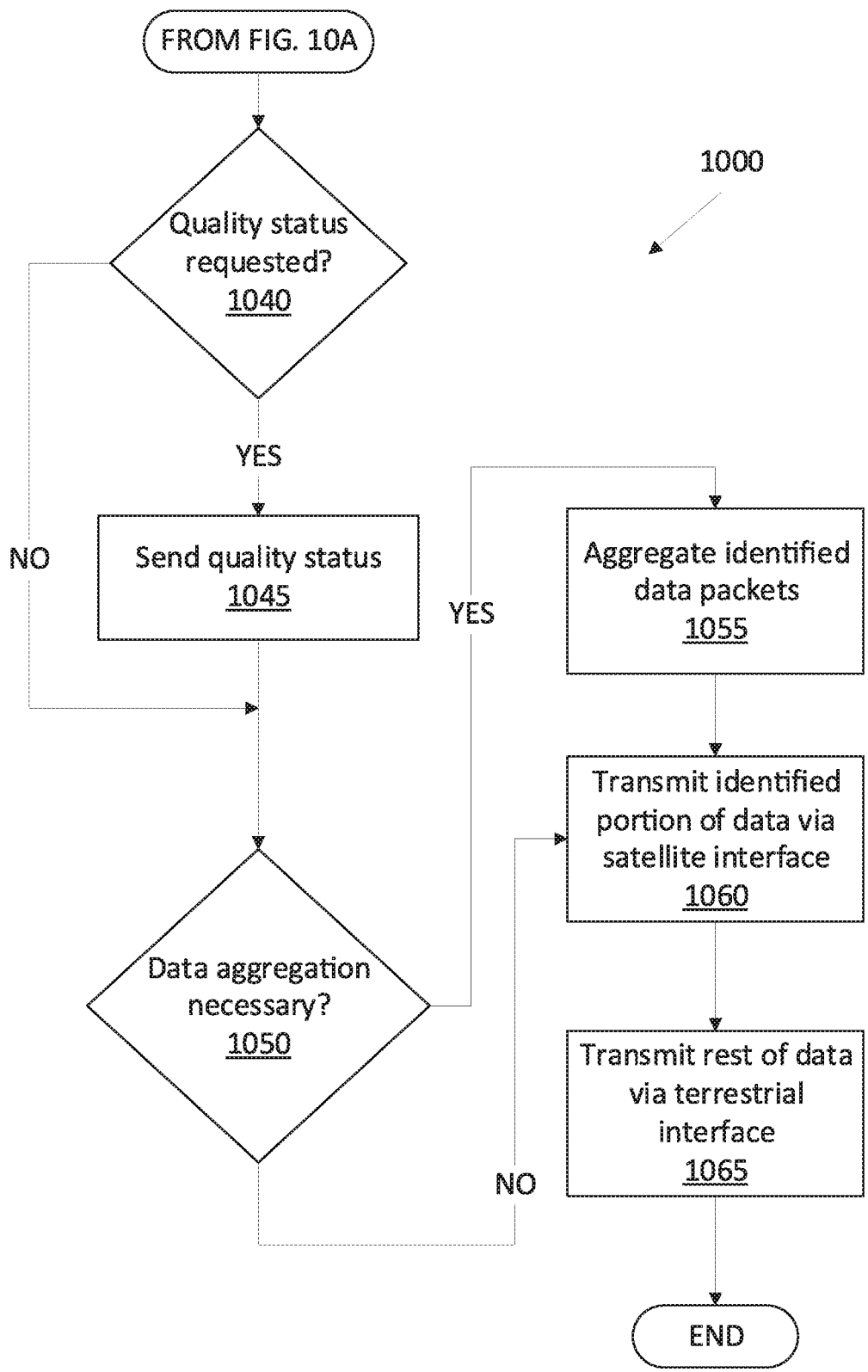

FIGS. 10A-10B show a flowchart of a process 1000 for routing data via the terrestrial and satellite interfaces 115, 120. The process 1000 specifies what may be performed in the blocks 440 or 560 of the processes 400, 500 to route the traffic data T, e.g., by sending out IoT devices 130 data to the remote computer 135 and/or receiving traffic data from the remote computer 135 and sending the received data to the IoT devices 130. For example, the terminal 105A computer 110 may be programmed to execute blocks of the process 1000.

The process 1000 begins in a block 1010, in which the computer 110 performs unicast security association. The computer 110 may be programmed to exchange encrypted information with the satellite 170 computer 172 and/or the gateway 180 (see FIGS. 7-8) and provide the terminal 105A specific key K1 to the computer 172 and/or the gateway 180 computer.

Next, in a decision block 1015, the computer 110 determines whether a common encryption key Km is received. With further reference to FIGS. 7-8, the computer 110 may be programmed to receive a common key Km encrypted based on the terminal 105A key K1 via the satellite link 145A. If the computer 110 receives the common key Km, then the process 1000 proceeds to a block 1020; otherwise the process 1000 returns to the decision block 1015.

In the block 1020, the computer 110 stores the received common key Km in a computer 110 memory. As discussed below, the computer 110 may decrypt the data multicast by the satellite 170 based on the stored common key Km.

Next, in a decision block 1025, the computer 110 determines whether encrypted multicast data is received. The computer 110 may be programmed to determine whether the received data is multicast data based on various techniques, e.g., based on determining that the received data is addressed (e.g., based on the terminal identifier) for a plurality of terminals 105A, 105B, 105C rather than specifically being addressed for the terminal 105A. If the computer 110 determines that encrypted multicast data is received, then the process 1000 proceeds to a block 1030; otherwise the process 1000 proceeds to a decision block 1040 (see FIG. 10B). Alternatively, the blocks 1010 to 1030 may be omitted, e.g., when no encrypted multicast is performed.

In the block 1030, the computer 110 decrypts the received encrypted data based on the received common key Km.

Next, in a block 1035, the computer 110 routes the decrypted data to the connected devices 130. For example, the computer 110 may be programmed to route the decrypted data to a plurality of IoT devices 130 via a local communication network 150. Non-limiting examples of locally-connected IoT devices 130 include temperature sensor, pressure sensors, utility company switching actuator, a programmable controller such as thermostat, etc. Following the block 1035, the process 1000 proceeds to a decision block 1040 (see FIG. 10B).

In the block 1040, the computer 110 determines whether a request for the quality status $R_Q$ is received. In one example, the request for quality status $R_Q$ may be a multicast message transmitted by the satellite to all terminals 105A, 105B, 105C. In another example, the request for quality status $R_{Qmay}$ be a message individually addressed to the respective terminal 105A, 105B, 105C, e.g., including the terminal identifier. If the computer 110 determines that a request for quality status $R_Q$ is received, then the process 1000 proceeds to a block 1045; otherwise the process 1000 proceeds to a decision block 1050.

In the block 1045, the computer 110 determines the quality status $R_Q$ and sends the determined quality status $R_Q$ to the satellite 170. The computer 110 may be programmed to determine the quality status $R_Q$ based on evaluating the communication via the satellite link 145A, e.g., determining link condition, etc. In one example, the computer 110 may store a table in the computer 110 memory that describes a relationship of quality status $R_Q$ with various parameters such as received power level, link condition, percentage of corrupted data, etc.

Next, in a decision block 1050, the computer 110 determines whether aggregating of traffic data for satellite link 145A is necessary. As discussed with respect to the function $f_3$ in equation (4), transmitting small packets of data may increase the score $S_S$. Upon determining that a number of small data packets (e.g., packets with a volume V less than a threshold, e.g., 1 kilobyte) exceeds a threshold, e.g., 100, the computer 110 may be programmed to determine that the identified small packets may be aggregated to reduce the score $S_S$ of the data being transmitted via the satellite link 145A.

In the block 1055, the computer 110 aggregates the identified data packets in an aggregated data packet including each of the small data packets. The computer 110 may be programmed to update the data portion $T_S$ for the satellite communication to replace the small data packets with the aggregated data packet. In one example, data aggregation may be implemented as a proxy server at satellite terminal 105A, 105B, 105C. In the present context, "updating" means replacing the small individual data packets from the data portion $T_S$ and storing instead the aggregated data packet in the data portion $T_S$. Thus, by updating the data portion $T_S$ for the satellite communication, the satellite link 145 may be utilized more efficiently because by aggregating the data packets a volume V of the data portion $T_S$ will be reduced.

Next, in a block 1060, the computer 110 may be programmed to transmit the identified data portion $T_S$ for satellite communication via the satellite link 145A. The computer 110 may be programmed to actuate the satellite communication interface 115 to route the data portions $T_S$.

Next, in a block 1065, the computer 110 routes the rest of the data, i.e., the data portion $T_T$ for the terrestrial communication via the terrestrial link 140. The computer 110 may be programmed to actuate the terrestrial communication interface 120 to transmit the data portion $T_T$. Following the block 1065, the process 1000 ends, or alternatively returns to the block 1010, although not shown in FIG. 10B.

Thus, there has been described a communication system that comprises a satellite terminal having a terrestrial communication interface, a satellite communication interface, and a computer. The terrestrial and satellite communication interfaces can be configured to communicate traffic data. The satellite terminal system can further include a computer communicatively linked to the terrestrial and satellite communication interfaces. According to one example, a computer of the terminal system may be programmed to determine that the traffic data, communicated via the terrestrial communication interface, exceeds a threshold, and based on the determination, route at least a portion of traffic data via the satellite communication interface in accordance with a predetermined traffic data load-balancing scheme.

According to another example, a satellite gateway computer may be programmed to receive, via a satellite uplink, a reception quality status including a link condition, and to adjust, based on the received quality status, at least one of multicast parameters including a data throughput, a transmission power, and a transmission spectral efficiency.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, network devices such as a gateway or terminal, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic®, Java Script®, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A system, comprising:
   a gateway computer, programmed to:
      distribute an encryption key, in a unicast mode, to a plurality of satellite terminals;
      receive data from a remote computer; and
      multicast the received remote computer data to the plurality of satellite terminals by:
      encrypting the received remote computer data with the encryption key; and
      multicasting the remote computer data encrypted with the encryption key to a plurality of terminals,
   wherein each of the plurality of satellite terminals includes:
      a terrestrial communication interface;
      a satellite communication interface, for satellite communication with the gateway computer via a satellite link, wherein the terrestrial and satellite communication interfaces are configured to communicate traffic data; and
      a satellite terminal computer communicatively linked to the terrestrial and satellite communication interfaces, wherein the satellite terminal computer executes instructions comprising, to:
  determine that the traffic data, communicated via the terrestrial communication interface, exceeds a threshold; and
  based on the determination, route at least a portion of traffic data via the satellite communication interface in accordance with a predetermined traffic data load-balancing scheme.

2. The system of claim 1, wherein the computer is further programmed to:
  determine a terrestrial link quantifier and a satellite link quantifier; and
  select at least one of the terrestrial communication interface and the satellite communication interface further based on the terrestrial link quantifier and the satellite link quantifier.

3. The system of claim 1, wherein the computer is further programmed to:
  determine a first score of the traffic data based on at least one of a data throughput, a data type quantifier, and a terrestrial link quantifier; and
  route at least the portion of traffic data via the satellite communication interface upon determining that the first score of the traffic data exceeds the threshold.

4. The system of claim 3, wherein the computer is further programmed to determine the data type quantifier based at least on one of the data throughput, a data volume, and a data priority.

5. The system of claim 4, wherein the computer is further programmed to determine the data priority based at least in part on a latency threshold of the traffic data.

6. The system of claim 1, wherein the computer is further programmed to:
  receive, via a local communication network, a plurality of data packets from a plurality of IoT devices;
  generate an aggregated data packet including the received plurality of data packets; and
  transmit the aggregated data packet via the satellite communication interface to a remote computer.

7. The system of claim 6, wherein the computer is further programmed to:
  determine a first score of the plurality of data packets for communicating via the terrestrial communication interface;
  determine a second score of the aggregated data packet for communicating via the satellite communication interface; and
  transmit the aggregated data packet via the satellite communication interface upon determining that first score exceeds the second score.

8. The system of claim 1, wherein the computer is further programmed to communicate with one or more IoT devices, via an IoT interface, wherein the traffic data includes data received from or sent to the one or more IoT devices.

9. The system of claim 1, further comprising an IoT device comprising a second computer, programmed to:
  receive the multicast including the encryption key and the encrypted remote computer data;
  decrypt the remote computer data based on the encryption key; and
  actuate an actuator based on the decrypted remote computer data.

10. The system of claim 1, wherein the gateway computer is further programmed to:
  receive, via a satellite uplink, a reception quality status including a link condition; and
  adjust, based on the received quality status, at least one of multicast parameters including a data throughput, a transmission power, and a transmission spectral efficiency.

11. The system of claim 10, wherein the gateway computer is further programmed to:
  divide, based on the received quality status, the plurality of terminals into a first group with a first set of multicast parameters and a second group with a second set of multicast parameters;
  multicast the remote computer data based on the first set of multicast parameters via a first downlink; and
  multicast the remote computer data based on the second set of multicast parameters via a second downlink.

12. The system of claim 1, wherein the gateway computer is further programmed to distribute the encryption key to the plurality of satellite terminals in unicast mode by transmitting data including the encryption key to each of the plurality of satellite terminals, wherein data transmitted to each of the satellite terminals, in unicast mode, is encrypted with a terminal-specific encryption key.

13. A method, comprising:
  distributing an encryption key, from a satellite gateway computer, in a unicast mode, to a plurality of satellite terminals;
  receiving data from a remote computer;
  multicasting the received remote computer data to the plurality of satellite terminals by:
  encrypting the received remote computer data with the encryption key; and
  multicasting the remote computer data encrypted with the encryption key to a plurality of terminals,
  determining, in a satellite terminal, that traffic data of the terminal, communicated via a terrestrial communication interface of the terminal, exceeds a threshold; and
  based on the determination, routing at least a portion of traffic data via a satellite communication interface of the terminal in accordance with a predetermined traffic data load-balancing scheme, wherein the terrestrial and satellite communication interfaces are configured to communicate traffic data.

14. The method of claim 13, further comprising:
  determining a terrestrial link quantifier and a satellite link quantifier; and
  selecting at least one of the terrestrial communication interface and the satellite communication interface further based on the terrestrial link quantifier and the satellite link quantifier.

15. The method of claim 13, further comprising:
  determining a score of the traffic data based on at least one of a data throughput, a data type quantifier, and a terrestrial link quantifier; and
  routing at least the portion of traffic data via the satellite communication interface upon determining that the score of the traffic data exceeds the threshold.

16. The method of claim 15, further comprising determining the data type quantifier based at least on one of the data throughput, a data volume, and a data priority.

17. The method of claim 16, further comprising determining the data priority based at least in part on a latency threshold of the traffic data.

18. A system, comprising:
  a terminal including:
    a terrestrial communication interface;
    a satellite communication interface, wherein the terrestrial and satellite communication interfaces are configured to communicate traffic data; and a computer communicatively linked to the terrestrial and satellite communication interfaces,
wherein the computer executes instructions comprising, to:
determine that the traffic data, communicated via the terrestrial communication interface, exceeds a threshold; and
based on the determination, route at least a portion of traffic data via the satellite communication interface in accordance with a predetermined traffic data load-balancing scheme;
a gateway computer, programmed to:
receive data from a remote computer;
multicast the received remote computer data to a plurality of terminals, wherein the plurality of terminals communicates with IoT devices via one or more local communication network;
distribute an encryption key, in a unicast mode, to a plurality of second computers;
encrypt the received remote computer data with the encryption key; and
multicast the received remote computer data to a plurality of terminals; and
an IoT device comprising one of the plurality of second computers, programmed to:
receive the distributed key and the encrypted multicast data;
decrypt the multicast data based on the distributed key; and
actuate an actuator based on the decrypted data.

* * * * *